US009535757B2

(12) United States Patent
Suzuki

(10) Patent No.: US 9,535,757 B2
(45) Date of Patent: *Jan. 3, 2017

(54) TASK ALLOCATION OPTIMIZING SYSTEM, TASK ALLOCATION OPTIMIZING METHOD AND TASK ALLOCATION OPTIMIZING PROGRAM

(71) Applicant: NEC CORPORATION, Tokyo (JP)

(72) Inventor: Noriaki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 14/365,872

(22) PCT Filed: Dec. 12, 2012

(86) PCT No.: PCT/JP2012/007947
§ 371 (c)(1),
(2) Date: Jun. 16, 2014

(87) PCT Pub. No.: WO2013/094156
PCT Pub. Date: Jun. 27, 2013

(65) Prior Publication Data
US 2014/0344825 A1    Nov. 20, 2014

(30) Foreign Application Priority Data

Dec. 19, 2011   (JP) ................. 2011-277267

(51) Int. Cl.
G06F 9/46     (2006.01)
G06F 9/50     (2006.01)

(52) U.S. Cl.
CPC ........... G06F 9/5022 (2013.01); G06F 9/5038 (2013.01); *G06F 2209/506* (2013.01)

(58) Field of Classification Search
None
See application file for complete search history.

(56) References Cited

U.S. PATENT DOCUMENTS 5,241,465 A * 8/1993 Oba .................. G06Q 10/0637
                                                        705/7.36
8,037,215 B2 * 10/2011 Gunnels .............. G06F 11/3404
                                                        703/13
(Continued)

FOREIGN PATENT DOCUMENTS

EP      0 901 074 A2     3/1999
JP      H11-85539 A      3/1999
(Continued)

OTHER PUBLICATIONS

Noriaki Suzuki et al., "Designing Evaluation Functions of Multi Core Task Mapping for Hard Real-Time Systems", The Special Interest Group (SIG) Technical Report of Information Processing Society of Japan (IPSJ), Mar. 18, 2011, vol. 2011-EMB-20, System LSI Design Methodology (SLDM)-149, No. 16, pp. 1-6, with English Abstract. Cited in ISR.

(Continued)

Primary Examiner — Hiren Patel
(74) Attorney, Agent, or Firm — Sughrue Mion, PLLC

(57) ABSTRACT

Provided is a task allocation optimizing system that, for a development target system which has a plurality of states and which is provided with multi-cores, makes an allocation of tasks to the cores such that a performance of the target system does not significantly degrade in a specific one of the states.

The task allocation optimizing system according to the present invention performs optimization by calculating, for each of the states, a state-evaluating-function value, which represents the preferability of an allocation to the cores, through using a task set operating in the state, and further calculating a consolidated evaluating-function value as a (Continued)

whole of operation of the target system, through consolidating the state-evaluating-function values for all states targeted for an evaluation.

15 Claims, 20 Drawing Sheets

(56) References Cited

U.S. PATENT DOCUMENTS

| | | | | |
|---|---|---|---|---|
| 8,387,066 B1* | 2/2013 | Becher | | G06F 9/4881 709/223 |
| 8,656,403 B2* | 2/2014 | An | | G06F 9/5038 718/104 |
| 8,793,365 B2* | 7/2014 | Arsovski | | G06F 9/5027 709/224 |
| 8,881,158 B2* | 11/2014 | Suzuki | | G06F 9/5038 718/102 |
| 2002/0138542 A1* | 9/2002 | Bollella | | G06F 9/4887 718/102 |
| 2005/0203879 A1* | 9/2005 | Doris | | G06F 9/50 |
| 2006/0218551 A1* | 9/2006 | Berstis | | G06F 9/4881 718/102 |
| 2007/0220517 A1* | 9/2007 | Lippett | | G06F 1/3203 718/102 |
| 2008/0077928 A1* | 3/2008 | Matsuzaki | | G06F 9/5044 718/104 |
| 2009/0158293 A1* | 6/2009 | Kajihara | | G06F 9/4881 718/106 |
| 2010/0107174 A1* | 4/2010 | Suzuki | | G06F 9/5033 718/104 |
| 2010/0131955 A1* | 5/2010 | Brent | | G06F 9/4843 718/103 |
| 2011/0088038 A1* | 4/2011 | Kruglick | | G06F 9/54 718/104 |
| 2011/0154351 A1* | 6/2011 | Henderson | | G06F 9/5027 718/104 |
| 2011/0161964 A1* | 6/2011 | Piazza | | G06F 9/4881 718/102 |
| 2013/0198757 A1* | 8/2013 | Kim | | G06F 9/5066 718/104 |
| 2013/0312001 A1* | 11/2013 | Suzuk | | G06F 9/5066 718/104 |

FOREIGN PATENT DOCUMENTS

| | | | | |
|---|---|---|---|---|
| JP | | 2007-264734 A | 10/2007 | |
| WO | WO 2008148624 A1 * | 12/2008 | | G06F 9/5066 |
| WO | | 2011/102219 A1 | 8/2011 | |

OTHER PUBLICATIONS

International Search Report for PCT Application No. PCT/JP2012/007947, mailed on Jan. 29, 2013.

* cited by examiner

Fig.4

STATE/TASK-SET RELATION TABLE

| STATE | S1 | S2 | S3 | S4 |
|---|---|---|---|---|
| TASK A | O | | | |
| TASK B | O | | | |
| TASK C | | O | O | |
| TASK D | | | O | |
| TASK E | | O | O | O |
| TASK F | | O | O | O |
| TASK G | | | O | O |

Fig.5

TASK-SET PARAMETER

| 0 | EXECUTION TIME |
|---|---|
| TASK A | 10 |
| TASK B | 8 |
| TASK C | 18 |
| TASK D | 14 |
| TASK E | 7 |
| TASK F | 16 |
| TASK G | 9 |

Fig.6

STATE/TASK-SET RELATION TABLE
(CONSOLIDATION OF TASK-SET PARAMETER)

| STATE  | S1 | S2 | S3 | S4 |
|--------|----|----|----|----|
| TASK A | 10 |    |    |    |
| TASK B | 8  |    |    |    |
| TASK C |    | 18 | 18 |    |
| TASK D |    |    | 14 |    |
| TASK E |    | 7  | 7  | 7  |
| TASK F |    | 16 | 16 | 16 |
| TASK G |    |    | 9  | 9  |

Fig.7

STATE/TASK-SET RELATION TABLE
(CONSOLIDATION OF TASK-SET PARAMETER)

| STATE | S1 | S2 | S3 | S4 |
|---|---|---|---|---|
| TASK A | 10 | | | |
| TASK B | 8 | | | |
| TASK C | | 18 | 18 | |
| TASK D | | | 14 | |
| TASK E | | 7 | 7 | 7 |
| TASK F | | 16 | 16 | 16 |
| TASK G | | | 9 | 9 |
| CORE 0 | 10 | 18 | 32 | 0 |
| CORE 1 | 8 | 23 | 32 | 32 |

CONSOLIDATED EVALUATING-FUNCTION VALUE: 2+5+32=39

Fig.8

STATE/TASK-SET RELATION TABLE
(CONSOLIDATION OF TASK-SET PARAMETER)

| STATE | S1 | S2 | S3 | S4 |
|---|---|---|---|---|
| TASK A | 10 | | | |
| TASK B | 8 | | | |
| TASK C | | 18 | 18 | |
| TASK D | | | 14 | |
| TASK E | | 7 | 7 | 7 |
| TASK F | | 16 | 16 | 16 |
| TASK G | | | 9 | 9 |
| CORE 0 | 10 | 25 | 34 | 16 |
| CORE 1 | 8 | 16 | 30 | 16 |

CONSOLIDATED EVALUATING-FUNCTION VALUE: 2+9+4=15

Fig. 9    TASK-SET PARAMETER IN SIXTH EXEMPLARY EMBODIMENT
|         | DEPENDENCY RELATION |
|---------|---------------------|
| TASK A  | B, C, G             |
| TASK B  |                     |
| TASK C  | D, E                |
| TASK D  | E, F                |
| TASK E  | F                   |
| TASK F  |                     |
| TASK G  |                     |
Fig. 10    DIAGRAM ILLUSTRATING DEPENDENCY BETWEEN TASKS
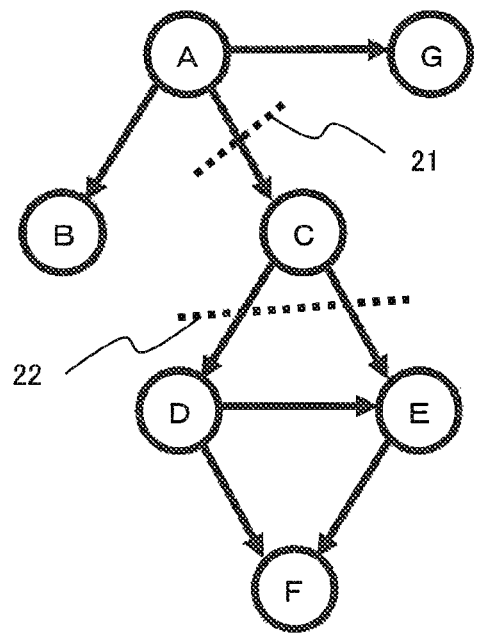

Fig.11  STATE/TASK-SET RELATION TABLE IN SIXTH EXEMPLARY EMBODIMENT

| STATE | S5 | S6 | S7 |
|---|---|---|---|
| TASK A | ○ | ○ | ○ |
| TASK B | ○ | | |
| TASK C | ○ | ○ | ○ |
| TASK D | ○ | | |
| TASK E | | ○ | |
| TASK F | ○ | ○ | ○ |
| TASK G | | ○ | |
| STATE-EVALUATING-FUNCTION VALUE (METHOD IN PTL 1) | 1 | 1 | 1 |
| STATE-EVALUATING-FUNCTION VALUE (SIXTH EXEMPLARY EMBODIMENT) | 1 | 1 | 0 |

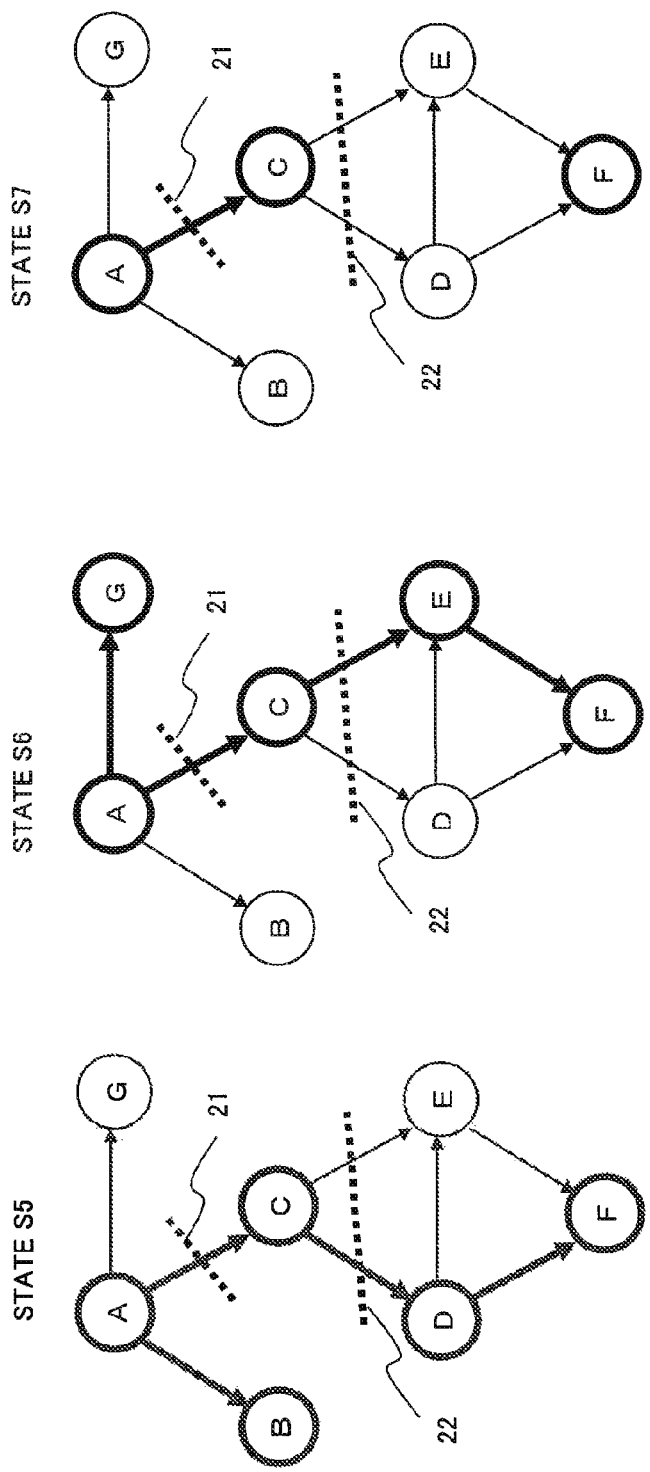
Fig.12 DIAGRAM ILLUSTRATING DEPENDENCY BETWEEN TASKS (IN VIEW OF CONDITION OF TASK OPERATION)

Fig.13

STATE/TASK-SET RELATION TABLE
(CONSOLIDATION OF TASK-SET PARAMETER)

| STATE | S1 | S2 | S3 | S4 |
|---|---|---|---|---|
| TASK A | 10 | | | |
| TASK B | 8 | | | |
| TASK C | | 18 | 18 | |
| TASK D | | | 14 | |
| TASK E | | 7 | 7 | 7 |
| TASK F | | 16 | 16 | 16 |
| TASK G | | | 9 | 9 |
| CORE 0 | 10 | 25 | 34 | 16 |
| CORE 1 | 8 | 16 | 30 | 16 |
| STATE-EVALUATING-FUNCTION VALUE | 2 | 2 | 2 | 2 |

Fig.14

STATE/TASK-SET RELATION TABLE
(CONSOLIDATION OF TASK-SET PARAMETER)

| STATE | S1 | S2 | S3 | S4 |
|---|---|---|---|---|
| TASK A | 10 | | | |
| TASK B | 8 | | | |
| TASK C | | 18 | 18 | |
| TASK D | | | 14 | |
| TASK E | | 7 | 7 | 7 |
| TASK F | | 16 | 16 | 16 |
| TASK G | | | 9 | 9 |
| CORE 0 | 18 | 18 | 32 | 0 |
| CORE 1 | 0 | 23 | 32 | 32 |
| STATE-EVALUATING-FUNCTION VALUE | 1 | 2 | 2 | 1 |

Fig. 16

STATE/TASK-SET RELATION TABLE IN
EIGHTH EXEMPLARY EMBODIMENT

| STATE | S5 | S6 | S7 |
|---|---|---|---|
| STATE IMPORTANCE DEGREE | 1 | 1 | 2 |

Fig.17  STATE/TASK-SET RELATION TABLE IN SIXTH AND EIGHTH EXEMPLARY EMBODIMENTS

| STATE | S5 | S6 | S7 |
|---|---|---|---|
| TASK A | ○ | ○ | ○ |
| TASK B | ○ | | |
| TASK C | ○ | ○ | ○ |
| TASK D | ○ | | |
| TASK E | ○ | ○ | |
| TASK F | ○ | ○ | ○ |
| TASK G | | ○ | |
| STATE-EVALUATING-FUNCTION VALUE — SIXTH EXEMPLARY EMBODIMENT DIVISION POSITION 23 | 1 | 1 | 1 |
| STATE-EVALUATING-FUNCTION VALUE — SIXTH EXEMPLARY EMBODIMENT DIVISION POSITION 24 | 2 | 1 | 0 |
| STATE-EVALUATING-FUNCTION VALUE — EIGHTH EXEMPLARY EMBODIMENT DIVISION POSITION 23 | 1 | 1 | 2 |
| STATE-EVALUATING-FUNCTION VALUE — EIGHTH EXEMPLARY EMBODIMENT DIVISION POSITION 24 | 2 | 1 | 0 |

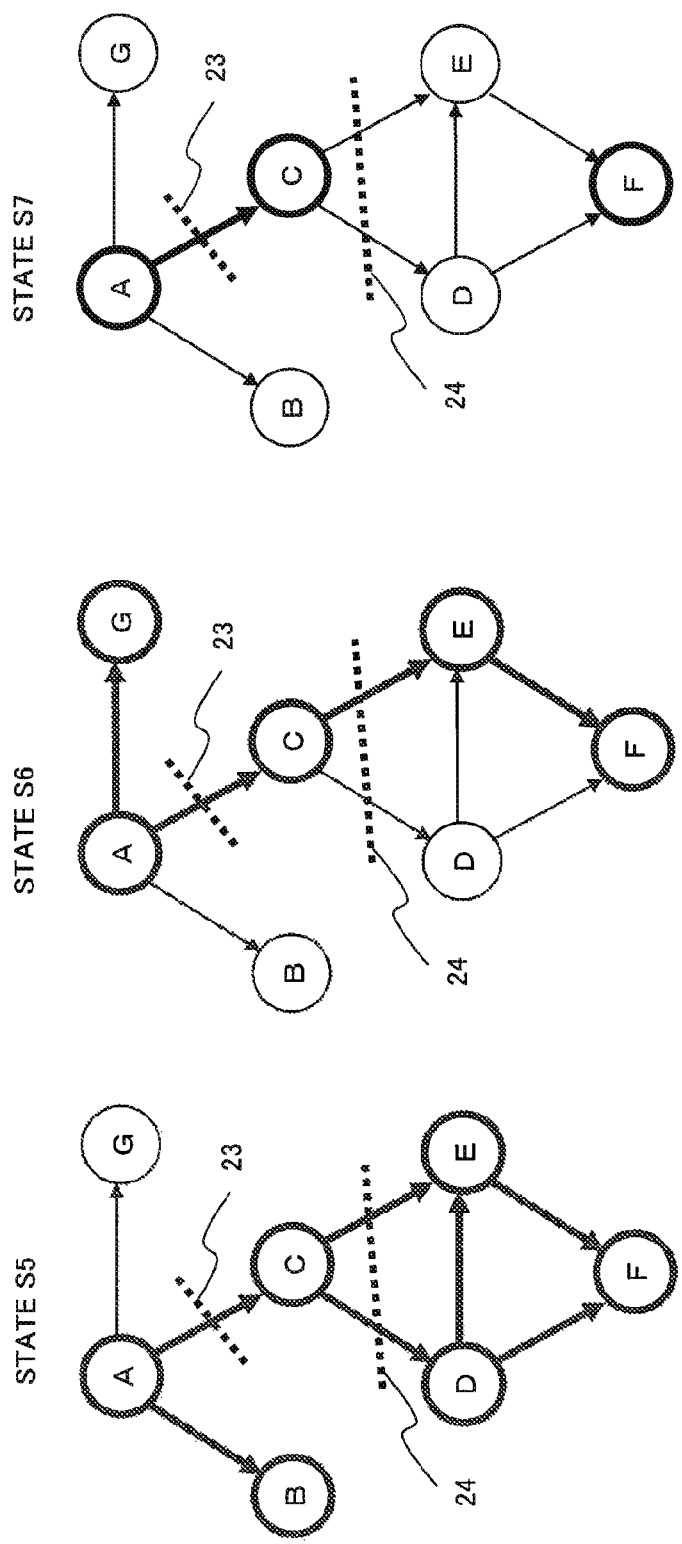

TASK ALLOCATION OPTIMIZING SYSTEM, TASK ALLOCATION OPTIMIZING METHOD AND TASK ALLOCATION OPTIMIZING PROGRAM

This application is a National Stage Entry of PCT/JP2012/007947 filed on Dec. 12, 2012, which claims priority from Japanese Patent Application 2011-277267 filed on Dec. 19, 2011 the contents of all of which are incorporated herein by reference, in their entirety.

TECHNICAL FIELD

The present invention relates to a task allocation optimizing system, a task allocation optimizing method and a task allocation optimizing program each targeting a multi-core system.

BACKGROUND ART

In response to a recent growing demand for a higher performance and lower power consumption of digital devices, a multi-core configuration in which a plurality of processor cores (hereinafter, each referred to as just a "core") is mounted in a large scale integration (LSI) has been drawing attention. A development of such a multi-core configuration based LSI has also become an important technology in real-time systems or the like aiming at system control.

Methods for this multi-core system are roughly classified into a symmetric multi-processing (SMP) method and an asymmetric multi-processing (AMP) method.

In the SMP method, task switching is performed in accordance with a situation of an available capability of each of cores, a priority of each of tasks currently being executed, and the like, and each of tasks can be executed on any one of the cores. For this reason, it becomes possible to implement an automatic load distribution, so that a performance of the whole system is enhanced. Nevertheless, such an automatic load distribution makes it difficult to grasp a real-time performance beforehand, and thus, it is difficult to apply the SMP method to a real-time system.

Meanwhile, the AMP method is based on a function distribution type configuration in which each of tasks is executed on its specific core. For this reason, the AMP method is suitable for a system, such as a real-time system for which it is important to be able to grasp behaviors of the system beforehand, or an embedded system in which there are restrictions on cores each connected to specific hardware.

In a multi-core system employing such an AMP method, its performance differs depending on to which of cores each of tasks is allocated. For this reason, in such a multi-core system employing the AMP method, it is necessary to search various task allocations and determine an optimum task allocation so that the multi-core system can be placed in an optimum operation state.

Hereinbefore, description has been made by providing a multi-core system employing the AMP method as an example. The above description is generally applicable to not only a multi-core system employing the AMP method but also a multi-core system employing a function distribution type method in which tasks are allocated to individual tasks on a fixed basis.

In Japanese Unexamined Patent Application Publication No. 2007-264734 (hereinafter, referred to as "patent literature 1 (PTL 1)", there has been disclosed a technology for a tuning support device which enables efficient software tuning for a multi-core processor provided with a plurality of cores. FIG. 21 illustrates a configuration of a tuning support device disclosed in PTL 1.

In the tuning support device, first, a granularity information acquiring unit 201 acquires information related to granularity allocated to each of cores (hereinafter, this information being referred to "granularity information"). This "granularity" is a unit of processing performed by, for example, a processor, and is a generic term representing a scale of a task, a function, or further, processes constituting a function.

A structure information generating unit 204 calculates a total appearance number for each of tasks or for each of functions included in tasks on the basis of the acquired granularity information, and generates information related to the calculated total appearance number (hereinafter, this information being referred to as "structure information").

A dependency information generating unit 206 generates information related to dependencies on other tasks or other functions (hereinafter, this information being referred to as "dependency information") for each of tasks or for each of functions included in tasks, on the basis of the acquired granularity information. An output unit 203 outputs these kinds of information.

Through this configuration, the tuning support device can efficiently analyze and manage the structure information for use in a load distribution. Though the use of information resulting from this analysis, for a multi-core processor, tasks are allocated to individual cores such that a processing performance of the multi-core system is enhanced.

SUMMARY OF INVENTION

Technical Problem

Nevertheless, in a task allocation made by the tuning support device disclosed in PTL 1, a problem that a task allocation is not optimum in a certain operation state is likely to occur. This problem will be described below.

In a general system, all tasks are not always operating, and a combination of operating tasks changes depending on an operation state in which the system is operating. In the above-described tuning support device, it is assumed to optimize a task allocation by using all tasks, as well as to optimize a task allocation by using a task set which operates only in a specific operation state. Through this method, a task allocation for all tasks or a task set operating in an operation state targeted for an observation is optimized, so that a load balance can be made even. Nevertheless, in operation states which are not considered in the tuning support device, a significant performance degradation, such as a deviation of a load balance, is likely to occur.

Object of Invention

The present invention has been made mainly in order to solve the aforementioned problem, and a main object of the present invention is to provide a task allocation optimizing system, a task allocation optimizing method and a task allocation optimizing program which make it possible to, in a multiprocessor system, realize a task allocation which does not cause any performance degradation in a specific operation state.

Solution to Program

A task allocation optimizing system according to a first aspect of the invention includes a state-evaluating-function value generating unit that, on the basis of a state/task-set relation table indicating relations of a list of a plurality of operation states which are changed in accordance with an operation condition of a system including a plurality of processor cores with a task set which is a set of a plurality of tasks each operating in at least one of the operation states, as well as a task-set parameter indicating a property of each of the tasks constituting the task set, and being reference information for use in making a task allocation which is an allocation of the tasks to the plurality of processor cores, generates, for each of the operation states, a state-evaluating-function value which is an evaluation value indicating a degree of preferability of a task allocation for the each operation state; a consolidated evaluating-function value generation unit that generate a consolidated evaluating-function value which is an evaluation value indicating a degree of preferability of a whole of the task set targeted for an evaluation, and which results from consolidating the state-evaluating-function value for each of the operation states; and an optimum allocation searching unit that searches for and makes a task allocation which maximizes the degree of preferability indicated by the consolidated evaluating-function value.

A task allocation optimizing method according to a second aspect of the invention includes, on the basis of a state/task-set relation table indicating relations of a list of a plurality of operation states which are changed in accordance with an operation condition of a system including a plurality of processor cores with a task set which is a set of a plurality of tasks each operating in at least one of the operation states, as well as a task-set parameter indicating a property of each of the tasks constituting the task set, and being reference information for use in making a task allocation which is an allocation of the tasks to the plurality of processor cores, generating, for each of the operation states, a state-evaluating-function value which is an evaluation value indicating a degree of preferability of a task allocation for the each operation state; generating a consolidated evaluating-function value which is an evaluation value indicating a degree of preferability of a whole of the task set targeted for an evaluation, and which results from consolidating the state-evaluating-function value for each of the operation states; and searching for and making a task allocation which maximizes the degree of preferability indicated by the consolidated evaluating-function value.

A task allocation optimizing program according to a third aspect of the present invention causes a computer to function as an optimum allocation searching unit which performs task allocation processing including the processes of: on the basis of a state/task-set relation table indicating relations of a list of a plurality of operation states which are changed in accordance with an operation condition of a system including a plurality of processor cores with a task set which is a set of a plurality of tasks each operating in at least one of the operation states, as well as a task-set parameter indicating a property of each of the tasks constituting the task set, and being reference information for use in making a task allocation which is an allocation of the tasks to the plurality of processor cores, generating, for each of the operation states, a state-evaluating-function value which is an evaluation value indicating a degree of preferability of a task allocation for the each operation state; generating a consolidated evaluating-function value which is an evaluation value indicating a degree of preferability of a whole of the task set targeted for an evaluation, and which results from consolidating the state-evaluating-function value for each of the operation states; and searching for and making a task allocation which maximizes the degree of preferability indicated by the consolidated evaluating-function value.

Advantageous Effects of Invention

According to the present invention, it is possible to provide a task allocation optimizing system, a task allocation optimizing method and a task allocation optimizing program which enable realization of a task allocation in a multiprocessor system, which does not cause a defect that a performance degrades in a certain operation state.

BRIEF DESCRIPTION OF DRAWINGS

FIG. 8 A state/task-set relation table illustrating operation of optimization of a task allocation optimizing system according to the third exemplary embodiment FIG. 9 A diagram illustrating a task parameter according to a sixth exemplary embodiment FIG. 10 A diagram illustrating dependency relations listed in a task-set parameter shown in FIG. 9

FIG. 11 A diagram illustrating a state/task-set relation table according to the sixth exemplary embodiment FIG. 12 A diagram illustrating operating tasks and an effective inter-core dependency in each operation task, according to the sixth exemplary embodiment FIG. 13 A state/task-set relation table illustrating operation of optimization which, in the case where the same task allocation as that shown in FIG. 8 is made, is performed by a task allocation optimizing system according to a seventh exemplary embodiment FIG. 14 A state/task-set relation table illustrating operation of optimization of a task allocation optimizing system according to the seventh exemplary embodiment FIG. 15 A block diagram illustrating a configuration of a task allocation optimizing system according to an eighth exemplary embodiment FIG. 16 A diagram illustrating a state importance-degree list according to the eighth exemplary embodiment FIG. 17 A state/task-set relation table illustrating operation of the same optimization as that of a task allocation optimizing system according to the sixth exemplary embodiment as well as operation of optimization of a task allocation optimizing system according to the eighth exemplary embodiment FIG. 18 A diagram illustrating operating tasks and an effective inter-core dependency in each task, according to the eighth exemplary embodiment FIG. 19 A block diagram illustrating a configuration of a task allocation optimizing system according to a ninth exemplary embodiment FIG. 20 A block diagram illustrating a minimum configuration of a task allocation optimizing system according to the first exemplary embodiment FIG. 21 A block diagram illustrating a configuration of a tuning support device according to PTL 1

DESCRIPTION OF EMBODIMENTS

Hereinafter, exemplary embodiments according to the present invention will be described with reference to the drawings. In a multi-core system employing the AMP method, performance varies depending on to which of cores each of cores is allocated. An object of a task allocation optimizing system according to this exemplary embodiment is to, in designing or implementing of a multi-core system employing the AMP method which adopts a "function distribution type" configuration in which each of tasks is executed by a specific one of cores, provide an optimized task allocation which brings about excellent performance of the multi-core system. In the following description, a multi-core system employing the AMP method and being a target for optimization made by a task allocation optimizing system according to this exemplary embodiment will be referred to just a multi-core system.

First Exemplary Embodiment

Figure 1:
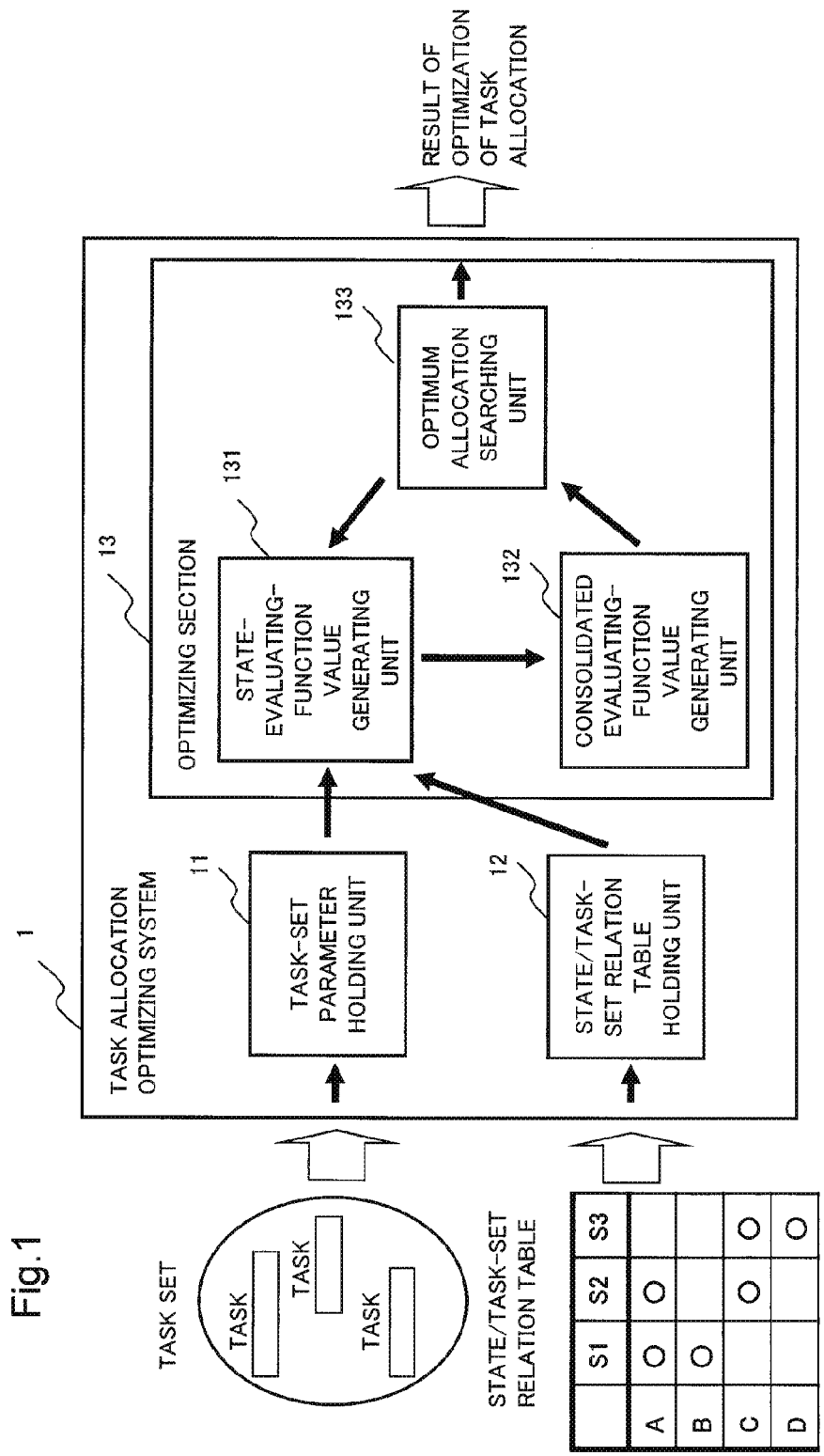
FIG. 1 A block diagram illustrating a configuration of a task allocation optimizing system according to a first exemplary embodiment FIG. 2 A flowchart illustrating a flow of processing performed by a task allocation optimizing system according to the first exemplary embodiment FIG. 3 A block diagram illustrating a configuration of a task allocation optimizing system according to a second exemplary embodiment FIG. 4 A diagram illustrating a specific example of a state/task-set relation table according to a third exemplary embodiment FIG. 5 A diagram illustrating a specific example of a task-set parameter according to the third exemplary embodiment FIG. 6 A consolidated table resulting from consolidating a state/task-set relation table and a task set parameter according to the third exemplary embodiment FIG. 7 A state/task-set relation table illustrating operation of optimization of a tuning support device according to PTL 1

FIG. 1 is a block diagram illustrating the whole of a configuration of a task allocation optimizing system according to this first exemplary embodiment. A task allocation optimizing system 1 includes a task-set parameter holding unit 11, a state/task-set relation table holding unit 12 and an optimizing unit 13.

The task-set parameter holding unit 11 holds a task-set parameter inputted from outside. This "task-set parameter" is information representing a property of each of tasks constituting a task set (i.e., a set of a plurality of tasks allocated to a multi-core system), and becomes reference information for use in a task allocation. As a specific example of the task-set parameter, an activation cycle, a dependency relation with a different task, execution time, a required memory size or the like, and these are written for each task.

The state/task-set relation table holding unit 12 holds a list of operation states and a state/task-set relation table. This operation states represent individual states which are changed in accordance with an operation condition of a target multi-core system. The state/task-set relation table represents relations between operation states and a task set including tasks each operating in corresponding ones of the operation states.

Each of general systems including such a multi-core system operates while changing its operation states in accordance with its operation condition. The change of operation states of a system causes various changes of operation of the system. For this reason, in general, tasks operating in a specific operation state are part of all tasks. The state/task-set relation table represents a relation between a list of operation states of a target system and a task set including tasks each operating in corresponding ones of the operation states.

The optimizing unit 13 includes a state-evaluating-function value generating unit 131, a consolidated evaluating-function value generating unit 132 and an optimum allocation searching unit 133.

The state-evaluating-function value generating unit 131 generates state evaluating function values while targeting a task set related to specific operation states. When describing this in detail, the state-evaluating-function value generating unit 131 reads out the task-set parameter from the task-set parameter holding unit 11, and reads out the state/task-set relation table from the state/task-set relation table holding unit 12. Further, the state-evaluating-function value generating unit 131 generates state evaluating function values on the basis of such read-out information while targeting a task set related to specific task operation states. In general, a state evaluating function value is generated for each of all operation states targeted for an evaluation. This "state evaluating function value" is an evaluation value representing a degree of favorability of a task allocation for each of operation states.

The consolidated evaluating-function-value generating unit 132 consolidates the state evaluating function values for all operation states targeted for an investigation, and generates a consolidated evaluating function value. This "consolidated evaluating function value" is an evaluation value representing a degree of favorability of a task allocation as a whole of a task set targeted for an evaluation.

The optimum allocation searching unit 133 searches for a task allocation which maximizes a degree of preferability indicated by the consolidated evaluating function value outputted by the consolidated evaluating-function-value generating unit 132. As the simplest searching method, a full search can be given. In the full search, all allocation candidates are generated in sequence, and among them, an allocation which maximizes a degree of preferability indicated by the consolidated evaluating function value is outputted on a display and the like as a result of the search. Nevertheless, in order to realize an efficient search, it is preferable to employ a well-known high-speed method, such as a branch limiting method, a greedy method or a genetic algorithm.

In addition, specific examples of the task-set parameter, the state/task-set relation table, the state evaluating function value and the consolidated evaluating function value will be described in a third exemplary embodiment and the like mentioned below.

Figure 2:
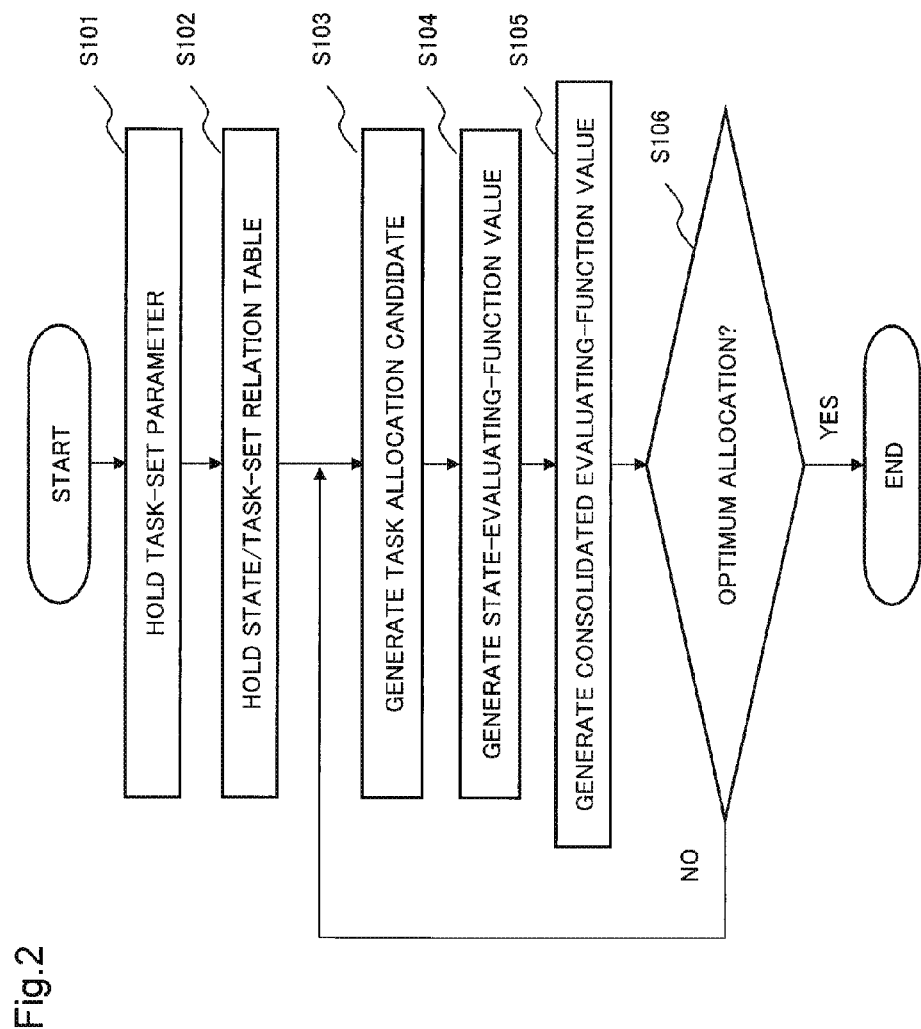

Next, operation of the task allocation optimizing system 1 according to this exemplary embodiment will be described with reference to a flowchart shown in FIG. 2.

First, the task-set parameter holding unit 11 holds a task-set parameter inputted from outside (Step S101). Next, the state/task-set relation table holding unit 12 holds a state/task-set relation table inputted from outside (Step S102).

In addition, steps S101 and S102 described above are steps carried out in random order, and step S102 can be carried out prior to step S101 or steps S101 and S102 can be carried out simultaneously.

The optimum allocation searching unit 133 generates a candidate for a task allocation (candidate data specifying to which of cores each of tasks is to be allocated) (S103). Further, the state-evaluating-function value generating section 131 generates a state-evaluating-function value for each of operation states with respect to the generated candidate for the task allocation (S104).

The consolidated evaluating-function value generating unit 132 generates a consolidated evaluating-function value resulting from consolidating the state-evaluating-function values having been generated by the state-evaluating-function value generating unit 131 (S105).

The optimum allocation searching unit 133 determines whether a task-allocation search completion condition is satisfied or not, in view of the consolidated evaluating-function value (S106). In the case where the task-allocation search completion condition is not satisfied (S106: No), the processing is repeated again from S103. In contrast, in the case where the task-allocation search completion condition is satisfied (S106: Yes), the optimum allocation searching unit 133 outputs a result of the optimization of the task allocation, and then terminates the processing.

The task-allocation search completion condition differs depending on what kind of optimization algorithm the optimum allocation searching unit 133 employs. In the case where the full search, which is simple as an optimization algorithm, is employed, the searching completion condition is to complete the generation of all candidates for a task allocation. In this case, the optimum allocation searching unit 133 outputs, as an optimization result, a candidate for a task allocation, having an optimum consolidated evaluating-function value. Meanwhile, in the case where a different general optimization algorithm is employed, the search completion condition is determined by taking into consideration a case where a consolidated evaluating-function value is determined as a value more favorable than any other expected value, or a case where a consolidated evaluating-function value is not improved even though the generation of a candidate for a task allocation is repeated predetermined times.

Subsequently, advantageous effects of the task allocation optimizing system according to this exemplary embodiment will be described. As described above, the state-evaluating-function value generating unit 131 calculates, for each of operation states, a state-evaluating-function value indicating a degree of preferability of a task allocation targeted for an evaluation on the basis of a state/task-set relation table and a task-set parameter. The consolidated evaluating-function value generating unit 132 consolidates this state-evaluating-function value for all the operation states targeted for the evaluation, and calculates a consolidated evaluating-function value which is an evaluation value indicating a degree of preferability of a task allocation as a whole of a task set targeted for the evaluation. Through optimization of a task allocation using this consolidated evaluating-function value, it becomes possible to take into consideration a processing performance in each of the operation states. Consequently, this enables prevention of the occurrence of the problem that a significant performance degradation occurs in specific operation states.

In the case where optimization of a task allocation is performed by using all tasks, just like the case of the tuning support device disclosed in PTL 1, even in a multi-core system whose performance is actually sufficient, a false determination that its performance is insufficient (for example, in the case of a real-time system, a dead line is not satisfied, or the like) is likely to be made. This is because, as described above, in a general system, all tasks are not always operating. For example, with respect to certain two tasks in a multi-core system, depending on operation states of the multi-core system, there occurs a case where only one of the two tasks operates, or the like, and thus, there is a case where it is inappropriate to handle all tasks in a lump.

The task allocation optimizing system according to this exemplary embodiment enables optimization in view of tasks which actually do not operate simultaneously by calculating a state-evaluating-function value for each of operation states, consolidating the state-evaluating-function values, and performing optimization on the basis of a result of the consolidation. Consequently, the task allocation optimizing system according to this exemplary embodiment makes it possible to, even when a multi-core system, for which it is determined that its performance is insufficient when its optimization is performed by using all tasks, is a target, output an optimum task allocation which brings about an appropriately satisfied performance.

Second Exemplary Embodiment

Figure 3:
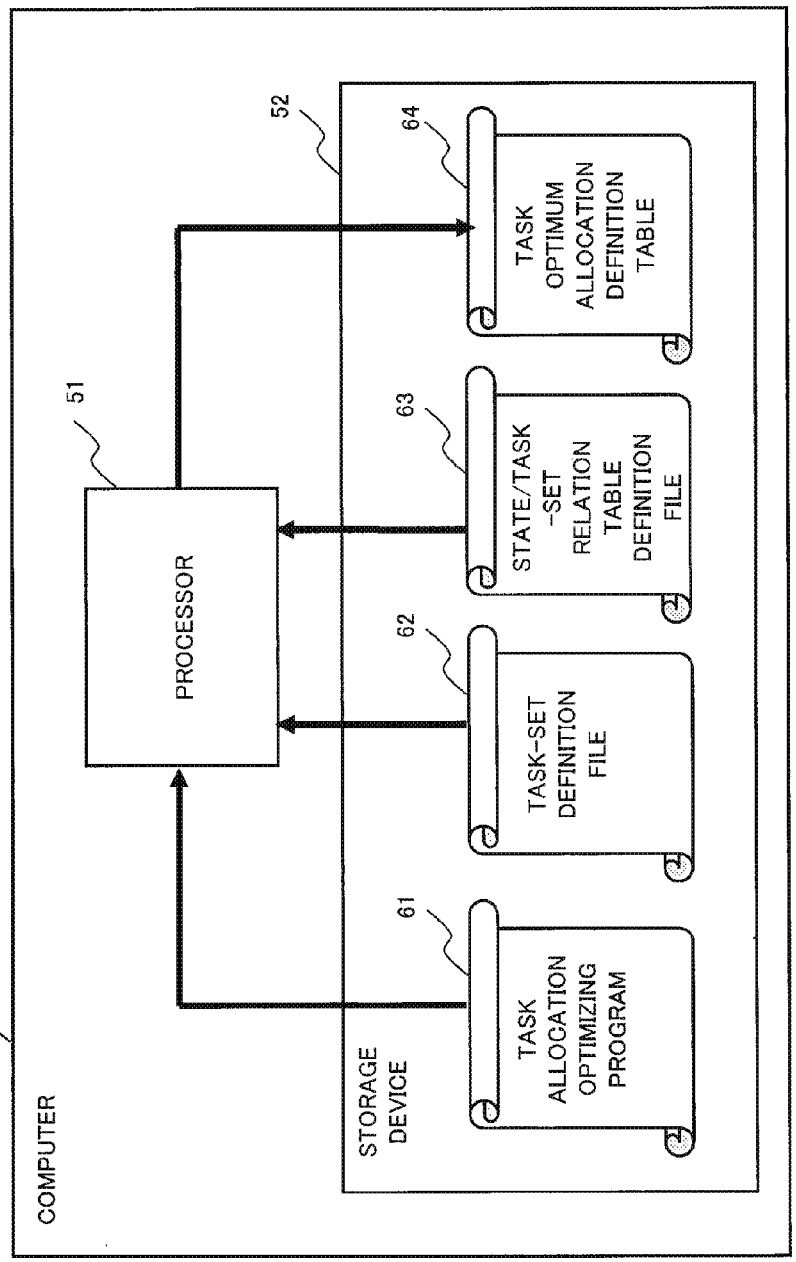

Next, a task allocation optimizing system according to a second exemplary embodiment of the present invention will be described in detail with reference to the drawings. FIG. 3 is a block diagram illustrating a configuration of the whole of a task allocation optimizing system according to this exemplary embodiment. The task allocation optimizing system according to this exemplary embodiment is characterized in that the processing having been described in the first exemplary embodiment is carried out as a program by a computer 5. Individual processes carried out as the program are almost the same as those in the first exemplary embodiment.

The computer 5 includes a processor 51 and a storage device 52. The storage device 52 corresponds to, for example, a hard disk or the like. The processor 51 operates as a task allocation optimizing system by executing the program.

A task set is represented on a task-set definition file 62. A state/task-set relation table is represented on a state/task-set relation table definition file 63. The task-set definition file 62 and the state/task-set relation table definition file 63 are read out from the processor 51 when a task allocation optimizing program 61 is executed. The processor 51 performs optimization of a task allocation by executing the task allocation optimizing program 61. The processor 51 outputs a result of optimization of a task allocation onto the storage device 52 as a task optimum allocation definition file 64.

The program is stored by using one of various types of non-transitory computer readable media, and can be supplied to the computer. The non-transitory computer readable media includes various types of tangible storage media. Examples of the non-transitory computer readable medium include a magnetic recording medium (for example, a flexible disc, a magnetic tape and a hard disk drive), a magneto-optical recording medium (for example, a magneto-optical disk), a compact disc-read only memory (CD-ROM), a compact disc-recordable (CD-R), a compact disc-rewritable (CD-R/W) and a semiconductor memory (for example, a mask ROM, a programmable ROM (PROM), an erasable PROM (EPROM), a flash ROM and a random access memory (RAM)). Further, the program may be supplied to the computer by one of various types of transitory computer readable media. Examples of the transitory computer readable medium include electric signals, light signals and electromagnetic waves. Such a transitory computer readable medium can supply the program to the computer via a wired communication path, such as an electric cable or an optic fiber, or a wireless communication path.

As described above, in the form of not only processing by hardware but also processing by a program executed by a computer, optimization of a task allocation in a function-distribution type multiprocessor system employing the AMP method can be realized.

Third Exemplary Embodiment

Next, operation of a task allocation optimizing system according to a third exemplary embodiment will be described in detail by using a specific practice example. In the following third to sixth exemplary embodiments, a multi-core system targeted by a task allocation optimizing system 1 includes a core 0 and a core 1.

In this exemplary embodiment, a state-evaluating-function value generating unit 131 generates, as a state-evaluating-function value, the absolute value of a difference between a total value of execution times when the core 0 executes tasks allocated to the core 0, and a total value of execution times when the core 1 executes tasks allocated to the core 1. A consolidated evaluating-function value generating unit 132 generates, as a consolidated evaluating-function value, a summation of state-evaluating-function values each associated with a corresponding one of operation states. An optimum allocation searching unit 133 performs optimization for searching for an allocation which minimizes the consolidated evaluating-function value. As described above, the task allocation optimizing method according to this exemplary embodiment is intended to obtain an allocation in which a load balance is adjusted such that total values each associated with execution times of a corresponding one of the cores become as mutually equal as possible.

FIG. 4 is a diagram illustrating a specific example of a state/task-set relation table. In such a way as shown in FIG. 4, relations between all operation states a target multi-core system can take, and tasks executed in these operation states are indicated. In the example shown in FIG. 4, the multi-core system can take four operations states S1, S2, S3 and S4. Further, in state S1, task A and task B are executed, and in state S2, task C, task E and task F are executed. Similarly, in state S3, tasks C to G are executed, and in state S4, task E, task F and task G are executed.

FIG. 5 is a diagram illustrating an example of a task-set parameter. In this exemplary embodiment, execution times each necessary for execution of a corresponding one of the tasks are indicated as parameters. FIG. 6 is a table obtained by consolidating the specific example of the state/task-set relation table shown in FIG. 4 and the specific example of the task-set parameter shown in FIG. 5.

Hereinafter, task-allocation optimization performed by the task allocation optimizing system when the state/task-set relation table shown in FIG. 4 and the task-set parameter shown in FIG. 5 are inputted will be described. The optimization is performed in view of equalizing execution times of tasks allocated to each of cores.

Optimization focusing attention on state S1 is independently performed. In optimization of states S2 to S4, optimization performed by using the optimizing method disclosed in PTL 1 and the optimizing method having been described in the first exemplary embodiment are compared with each other.

In the optimizing method disclosed in PTL 1, there will be described a case where optimization focusing attention on state S3 in which the largest number of tasks operate is performed. FIG. 7 shows a state/task-set relation table illustrating a condition of the optimization.

In FIG. 7, in each task row, there is indicated at least one execution time each having been shown in FIG. 5 as an execution time when a task associated with the task row is executed in a corresponding one of the operation states. Among the tasks, tasks each having at least one execution time enclosed by a dashed line (i.e., tasks A, C and D) are allocated to a core 0, and the other tasks are allocated to a core 1. In FIG. 7, in a row corresponding to each of the cores 0 and 1, a total of execution times of tasks allocated to the each of the cores 0 and 1 are indicated for each of the states (states S1 to S4).

In the example shown in FIG. 7, optimization focusing attention on the state 3 is performed. That is, in state S3, an execution time in the core 0 and an execution time in the core 1 are completely balanced (that is, the execution times have the same value "32"). In contrast, in the case of this task allocation, in state S4, tasks are executed only in the core 1 and any tasks are not executed in the core 0. That is, in state S4, the task allocation results in an unbalanced state.

State-evaluating-function values in this case, that is, the absolute value of a difference between a total value of execution times of the core 0 and a total value of execution times of the core 1 for each of the states are: |10−8|=2 in state S1; |18−23|=5 in state 2; |32−32|=0 in state S3; and |0−32|=32 in state S4.

Subsequently, an example of a result of optimization performed by the task allocation optimizing system according to the first exemplary embodiment will be described. A consolidated evaluating-function value in the case of the above-described task allocation shown in FIG. 7, that is, the summation of the state-evaluating-function values in their respective corresponding states is: 2+5+0+32=39. Nevertheless, actually, there exists a task allocation which has a smaller consolidated evaluating-function value. In the task allocation optimizing system 1 in this example, an allocation which has a minimum consolidated evaluating-function value is made an optimum allocation. Various existing technologies each adopting an optimization algorithm can be applied to the optimum allocation searching unit 133. An example of an optimum allocation calculated by the optimum allocation searching unit 133 is shown in FIG. 8.

State-evaluating-function values in an allocation shown in FIG. 8 are: |10−8|=2 in state S1; |25−16|=9 in state 2; |34−30|=4 in state S3; and |16−16|=0 in state S4.

Accordingly, a consolidated evaluating-function value in the allocation shown in FIG. 8 is: 2+9+4+0=15, and results in being smaller than the consolidated evaluating-function value shown in FIG. 7. The allocation shown in FIG. 8 results in an allocation which is balanced to a greater degree in execution times in each state, as compared with the allocation shown in FIG. 7.

Next, an example of a target system including three or more cores will be described. As described above, the task allocation optimizing method in this practice example is intended to obtain an allocation in which a load balance is adjusted such that total values each associated with execution times of a corresponding one of cores become as equal to one another as possible.

Thus, in a target system including n cores (n being an integer larger than or equal to three), first, tasks are allocated to the n cores, and then, for each of the cores, a total value of execution times when the core executes tasks allocated to itself is calculated. Further, two cores are selected from among the n cores, and for the selected two cores, in the same way as that for the above-described case of the two cores, the absolute value of a difference between a total value of execution times of one of the cores and a total value of execution times of the other one of the cores is generated as a temporary state-evaluating-function value. This processing is performed on each of a plurality of groups each being a combination of two cores selected from among the n cores, and thereby a plurality of temporary state-evaluating-function values are generated. Further, in this case, a state-evaluating-function value as a whole of a system in a certain state, which is similar to that of the system including the two cores, is composed of the plurality of temporary state-evaluating-function values which is associated with the state. In general, the temporary state-evaluating-function values are generated for each of all combinations of two cores. The state-evaluating-function value is composed of temporary state-evaluating-function values each associated with a corresponding one of the all combinations. In the system including three or more cores, in such a way as described above, a state-evaluating-function value of each state is obtained by calculating, for each of combinations of every two cores, a temporary state-evaluating-function value of the each state once, and consolidating the temporary state-evaluating-function values. A method for consolidating the temporary state-evaluating-function values to obtain the state-evaluating-function value is not limited to a specific one. As the consolidating method, an appropriate arithmetic operation method, such as summation or multiplication, can be employed in accordance with necessary conditions and required conditions with respect to properties and the like required by a target system.

Specifically, a target system including three cores 0, 1 and 2 will be described. In this system, a temporary state-evaluating-function value of a certain state is made the absolute value of a difference between a total value of execution times of tasks allocated to one of the three cores and a total value of execution times of tasks allocated to another one of the three cores. For example, the absolute value of a difference between a total value of execution times of tasks allocated to the core 0 and a total value of execution times of tasks allocated to the core 1 is made a temporary state-evaluating-function value 01. Similarly, the absolute value of a difference between a total value of execution times of the core 0 and total values of execution times of the core 2 is made a temporary state-evaluating-function value 02. Similarly, in the case of the core 1 and the core 2, the absolute value of a difference between two kinds of total values is made a temporary state-evaluating-function value 12. Thus, the state-evaluating-function value is composed of the three temporary state-evaluating-function values: the temporary state-evaluating-function value 01; the temporary state-evaluating-function value 02; and the temporary state-evaluating-function value 12.

In this case, the consolidated evaluating-function value generating means 132 generates a state-evaluating-function value by calculating the summation of the plurality of temporary state-evaluating-function values in each operation state. Further, the consolidated evaluating-function value generating means 132 generates a consolidated evaluating-function value composed of, for example, a simple evaluation value by calculating, just like the case of two cores, the summation of the state-evaluating-function values with respect to all operation states targeted for an evaluation.

In addition, in the above description, the summation of the temporary state-evaluating-function values and the summation of the state-evaluating-function values are calculated, and are generated as the state-evaluating-function value and the consolidated evaluating-function value, respectively, but, as described above, the arithmetic operation method is not limited to the summation.

Specifically, an example, in which, in the system including three cores: a core 0, a core 1 and a core 2, the state-evaluating-function value is consolidated as the summation of absolute values, will be described. In this system, a temporary state-evaluating-function value of a certain state is made the absolute value of a difference between a total value of execution times of tasks allocated to one of the three cores and a total value of execution times of tasks allocated to another one of the three cores. For example, the absolute value of a difference between a total value of execution times of tasks allocated to the core 0 and a total value of execution times of tasks allocated to the core 1 is made a temporary state-evaluating-function value 01. Similarly, the absolute value of a difference in the case of the core 0 and the core 2 is made a temporary state-evaluating-function value 02, and the absolute value of a difference in the case of the core 1 and the core 2 is made a temporary state-evaluating-function value 12. In this case, the state-evaluating-function value can be generated as: the temporary state-evaluating-function value 01+the temporary state-evaluating-function value 02+the temporary state-evaluating-function value 12.

In this way, in a method for obtaining a state-evaluating-function value as a simple evaluation value in a target system including three or more cores, first, an arithmetic operation of consolidating a plurality of temporary state-evaluating-function values which are constituents of the state-evaluating-function value, and generating the state-evaluating-function value composed of a simple evaluation value is performed. Further, next, the consolidated evaluating-function value generating means 132 performs an arithmetic operation of consolidating a plurality of state-evaluating-function values and generating a consolidated evaluating-function value. As a result, a plurality of different consolidated evaluating-function values each associated with a corresponding one of various task allocations is obtained. Accordingly, through employing appropriate consolidated evaluating-function values, it becomes possible to make task allocations of various properties.

Through employing the above-described method, when total values each associated with execution times taken for a corresponding one of core 0, core 1 and core 2 to execute tasks allocated to itself are made equal to one another, the state-evaluating-function value becomes minimum. Accordingly, it is possible to, just like the case of two cores, obtain a task allocation resulting from adjusting a load balance such that total values each associated with execution times of a corresponding one of the cores become as equal to one another as possible Similarly, the above exemplary embodiment in the case of three cores can be expanded to a case of four or more cores.

Fourth Exemplary Embodiment

In this fourth exemplary embodiment, as an application example of the task allocation optimizing system 1 according to the third exemplary embodiment, the square of a difference between total values each associated with execution times taken for a corresponding one of the cores executes tasks allocated to itself is made a state-evaluating-function value. That is, the state-evaluating-function value generating unit 131 calculates a difference between a total value of execution times of tasks allocated to a core 0 and a total value of execution times of tasks allocated to a core 1, and then generates the square of the calculated difference as a state-evaluating-function value. The consolidated evaluating-function value generating unit 132 generates, as a consolidated evaluating-function value, the summation of the state-evaluating-function values each associated with a corresponding one of operation states. As described above, the task allocation optimizing method according to this exemplary embodiment focuses attention on the equalization of total values each associated with execution times of a corresponding one of cores, just like in the third exemplary embodiment.

In the following description, there will be described two allocation examples in which their respective corresponding consolidated evaluating-function values are made the same value by the task allocation optimizing system 1 of the third exemplary embodiment. In a first allocation A, in states S1, S2, S3 and S4, their respective corresponding state-evaluating-function values are 1, 1, 1 and 5. In a second allocation B, in states S1, S2, S3 and S4, their respective corresponding state-evaluating-function values are 2, 2, 2 and 2. When consolidated evaluating-function values of these allocations are generated by the task allocation optimizing system 1 according to the third exemplary embodiment, resultant values become 1+1+1+5=8 in the case of the allocation A and 2+2+2+2=8 in the case of the allocation B, and have the same value.

In the task allocation optimizing system 1 according to the fourth exemplary embodiment, a state evaluation value function value is the square of a difference between two kinds of execution times, and consolidated evaluating-function values become 1+1+1+25=28 in the case of the allocation A and 4+4+4+4=16 in the case of the allocation B. The optimum allocation searching unit 133 determines, as an optimum allocation, an allocation for which the consolidated evaluating-function value has a minimum value.

As described above, in the fourth exemplary embodiment, an influence of an operation state, for which a deviation of balance of a task allocation (i.e., a deviation of a state-evaluating-function value) is large, on a consolidated evaluating-function value becomes large. "An operation state for which a deviation of a state-evaluating-function value is large" means that a state-evaluating-function value of the operation state deviates from those of the other operation states. Thus, in the case where it is desired to the utmost to prevent the occurrence of an operation state in which balance is significantly unpreferable, it is effective to make the state-evaluating-function value the square of a difference between two kinds of execution times, just like in this example.

Next, an example of a target system including three or more cores will be described. As described above, the task allocation optimizing method according to this exemplary embodiment focuses attention on the equalization of total values each associated with execution times of a corresponding one of cores, just like in the third exemplary embodiment.

Thus, in a target system including n cores (n being an integer larger than or equal to three), first, tasks are allocated to the n cores, and then, for each of the cores, a total value of execution times when the core executes tasks allocated to itself is calculated. Further, two cores are selected from among the n cores, and for the selected two cores, in the same way as that for the above-described case of two cores, the square of a difference between a total value of execution times of one of the cores and a total value of execution times of the other one of the cores is generated as a temporary state-evaluating-function value. This processing is performed on each of a plurality of groups each being a combination of two cores selected from among the n cores, and thereby a plurality of temporary state-evaluating-function values are generated. Further, in this case, a state-evaluating-function value as a whole of a system in a certain state, which is similar to that of the system including two cores, is composed of the plurality of temporary state-evaluating-function values which is associated with each operation state. In general, the temporary state-evaluating-function values are generated for each of all combinations of two cores. The state-evaluating-function value is composed of temporary state-evaluating-function values each associated with a corresponding one of the all combinations. In the system including three or more cores, in such a way as described above, a state-evaluating-function value of each state is obtained by calculating, for each of combinations of every two cores, a temporary state-evaluating-function value of the each state once, and consolidating the temporary state-evaluating-function values. A method for consolidating the temporary state-evaluating-function values to obtain the state-evaluating-function value is not limited to a specific one. As the consolidating method, an appropriate arithmetic operation method, such as summation or multiplication, can be employed in accordance with necessary conditions and required conditions with respect to properties and the like required by a target system.

Specifically, a target system including the three cores 0, 1 and 2 will be described. In this system, a temporary state-evaluating-function value of a certain state is made the square of a difference between a total value of execution times of tasks allocated to one of the three cores and a total value of execution times of tasks allocated to another one of the three cores. For example, the square of a difference between a total value of execution times of tasks allocated to the core 0 and the square of execution times of tasks allocated to the core 1 is made a temporary state-evaluating-function value 01. Similarly, the square of a difference between a total value of execution times of the core 0 and the square of execution times of the core 2 is made a temporary state-evaluating-function value 02. In the case of the core 1 and the core 2, the square of a difference between two kinds of total values is also made a temporary state-evaluating-function value 12. In this case, the state-evaluating-function value is composed of the three temporary state-evaluating-function values, that is, the temporary state-evaluating-function value 01, the temporary state-evaluating-function value 02 and the temporary state-evaluating-function value 12.

In this case, the consolidated evaluating-function value generating means 132 generates a state-evaluating-function value by calculating the summation of the plurality of temporary state-evaluating-function values in each operation state. Further, the consolidated evaluating-function value generating means 132 generates a consolidated evaluating-function value composed of, for example, a simple evaluation value by calculating, just like the case of two cores, the summation of the state-evaluating-function values with respect to all operation states targeted for an evaluation.

In addition, in the above description, the summation of the temporary state-evaluating-function values and the summation of the state-evaluating-function values are calculated, and are generated as the state-evaluating-function value and the consolidated evaluating-function value, respectively, but, as described above, the arithmetic operation method is not limited to the summation.

Specifically, an example in which, in the system including the three cores 0, 1 and 2 the state-evaluating-function value is consolidated as the summation of the squares will be described. In this system, a temporary state-evaluating-function value of a certain state is made the square of a difference between a total value of execution times of tasks allocated to one of the three cores and a total value of execution times of tasks allocated to another one of the three cores. For example, the square of a difference between a total value of execution times of tasks allocated to the core 0 and a total value of execution times of tasks allocated to the core 1 is made a temporary state-evaluating-function value 01. Similarly, the square in the case of the core 0 and the core 2 is made a temporary state-evaluating-function value 02, and the square in the case of the core 1 and the core 2 is made a temporary state-evaluating-function value 12. In this case, the state-evaluating-function value can be generated as: the temporary state-evaluating-function value 01+the temporary state-evaluating-function value 02+the temporary state-evaluating-function value 12.

In this way, in a method for obtaining a state-evaluating-function value as a simple evaluation value in a target system including three or more cores, first, an arithmetic operation of consolidating a plurality of temporary state-evaluating-function values which are constituents of the state-evaluating-function value, and generating the state-evaluating-function value composed of a simple evaluation value is performed. Further, next, the consolidated evaluating-function value generating means 132 performs an arithmetic operation of consolidating a plurality of state-evaluating-function values and generating a consolidated evaluating-function value. As a result, a plurality of different consolidated evaluating-function values each associated with a corresponding one of various task allocations is obtained. Accordingly, through employing appropriate consolidated evaluating-function values, it becomes possible to make task allocations of various properties.

Through employing the above-described method, when total values each associated with execution times taken for a corresponding one of the core 0, the core 1 and the core 2 to execute tasks allocated to itself are made equal to one another, the state-evaluating-function value becomes minimum. Accordingly, it is possible to, just like the case of two cores, obtain a task allocation resulting from adjusting a load balance such that total values each associated with execution times of a corresponding one of the cores become as equal to one another as possible Similarly, the above exemplary embodiment in the case of three cores can be expanded to a case of four or more cores.

Fifth Exemplary Embodiment

In this fifth exemplary embodiment, as an application example of the task allocation optimizing system 1 according to the third exemplary embodiment, a consolidated evaluating-function value is made the multiplication of state-evaluating-function values. That is, the state-evaluating-function value generating unit 131 calculates a difference between a total value of execution times of tasks allocated to the core 0 and a total value of execution times of tasks allocated to the core 1, and then generates the absolute value of the calculated difference as a state-evaluating-function value. The consolidated evaluating-function value generating unit 132 generates the multiplication of the state-evaluating-function values each associated with a corresponding one of operation states as a consolidated evaluating-function value. The task allocation optimizing method according to this exemplary embodiment also focuses attention on the equalization of total values each associated with execution times of a corresponding one of cores, just like in the third and fourth exemplary embodiments.

The content of processing of this exemplary embodiment will be described by using the same allocation A and allocation B as those of the fourth exemplary embodiment. In this case, the consolidated evaluating-function value becomes: 2×2×2×2=16 in the case of the allocation A, and 1×1×1×5=5 in the case of the allocation B. The optimum allocation searching unit 133 determines, as an optimum allocation, an allocation having a smaller consolidated evaluating-function value than any other one, and thus, determines the allocation A as an appropriate allocation.

In this way, in the fifth exemplary embodiment, when there exist a large number of operation states for each of which a deviation of balance of a task allocation is small (i.e., a large number of operation states for each of which a difference in the state-evaluating-function value is small), the consolidated evaluating-function value becomes small. The "operation states for each of which a difference in the state-evaluating-function value is small" means that a state-evaluating-function value of each of the operation states is mostly equal to a state-evaluating-function value of any other one of the operation states. Because of such a property, even in the case where there exists any operation state for which a load balance is rather unpreferable (i.e., any operation state for which a difference in the state-evaluating-function value is large), when a deviation of load balance in each of as many operation states as possible is desired to be made small, the method according to this fifth exemplary embodiment (i.e., the method in which the consolidated evaluating-function value is made the multiplication of the state-evaluating-function values) is effective.

In this regard, nevertheless, in the case were the consolidated evaluating-function value is made the multiplication of the state-evaluating-function values, if, in the state-evaluating-function values, there merely exists a state-evaluating-function value which equals to "0", the consolidated evaluating-function value becomes "0" regardless of state-evaluating-function values of the other operation states. For this reason, when determining a calculating method for the state-evaluating-function value, it is necessary to take measures, such as an addition of an appropriate offset value, in order not to cause the state-evaluating-function value to become "0".

Sixth Exemplary Embodiment

As a task allocation optimizing system 1 according to a sixth exemplary embodiment, an example, in which a task set parameter in which inter-task dependencies are written is inputted, will be described. A state-evaluating-function value generating unit 131 calculates, for each operation state, "an inter-core dependency number" which represents the magnitude of a dependency relation between tasks of a plurality of tasks each being allocated to any one of mutually different cores, and outputs it as a state-evaluating-function value. The "dependency relation between tasks" means that, between certain two tasks, in order for one of the tasks to use a result of processing having been performed by the other one of the tasks, there is a condition on processing order.

Further, the "inter-core dependency" means a state where, when there exists a plurality of tasks which includes pairs of tasks, each of the pairs having the dependency relation, each of tasks included in the pair is allocated to a corresponding one of mutually different cores. As an example, only two tasks, that is, a task A and a task B depending on the task A, are considered. When each of the tasks A and B is allocated to a corresponding one of mutually different cores, the inter-core dependency number is "1". When the tasks A and B are allocated to the same core, the inter-core dependency number is "0".

In general, a certain period of time is necessary for a data transfer to be performed between cores, and thus, it is preferable that the number of inter-core dependencies is as small as possible.

In this exemplary embodiment, an optimization example, in which an inter-core dependency number is minimized under the condition where, in each of all operation states, a total number of tasks allocated to one of cores may be the same as a predetermined number or may be different from the predetermined number by one, will be described.

An example of a task-set parameter is illustrated in FIG. 9. In FIG. 9, in a column "dependency relation", information indicating tasks depending on each of tasks shown in another column is listed. For example, task B, task C and task G are listed in a row corresponding to task A. This indicates that task B, task C and task G depend on task A. That is, task B, task C and task G each perform processing using a result of processing having been performed by task A.

FIG. 10 is a diagram illustrating the dependency relation listed in the task-set parameter shown in FIG. 9.

FIG. 11 illustrates a state/task-set relation table indicating a list of operation states of a target system, and relations between the operation states and sets of tasks, each set operating in a corresponding one of the operation states. In the example shown FIG. 11, there are three states S5, S6 and S7 as the operation states of the target system. In state S5, task A, task B, task C, task D and task F operate. In state S6, task A, task C, task E, task F and task G operate. Similarly, in state S7, task A, task C and task F operate.

First, a determination of an optimum allocation, according to the optimizing method disclosed in PTL 1, will be described. In this method, it is not considered which task operates in each operation state. Thus, when a degree of dependency of the whole of a task set is considered, an allocation candidate in which a task allocation is divided between tasks such that this division makes a dependency number minimum is outputted. In the example shown in FIG. 10, a task allocation is divided at a division position 21. That is, a task allocation in which task A, task B and task G are allocated to a core 0, and task C, task D, task E and task F are allocated to a core 1 (the core 0 and the core 1 may be reversed to each other) is outputted as a task allocation candidate. In this way, the "dividing a task allocation" means dividing a plurality of tasks into mutually different cores.

An inter-core dependency number in a task allocation candidate according to the relevant method (i.e., the task allocation divided at the division position 21 in FIG. 10) will be described below. FIG. 12 is a diagram in which only operating tasks and effective inter-core dependencies are each denoted by a thick line. As is obvious from FIG. 12, in the optimizing method disclosed in PTL 1, there exists only one inter-core dependency in each of all the operation states.

Next, optimization performed by the task allocation optimizing system 1 according to this exemplary embodiment will be described. As described above, the state-evaluating-function value generating unit 131 outputs an inter-core dependency number for each state as a state-evaluating-function value. A consolidated evaluating-function value generating unit 132 calculates a consolidated evaluating-function value by consolidating the state-evaluating-function values. An optimum allocation searching unit 133 performs optimization by using this consolidated evaluating-function value. Through such optimization, division positions other than the division position 21 in FIGS. 10 and 12 can be candidates.

When a division position 22 in FIGS. 10 and 12 is made a task allocation candidate, a task allocation is divided between task C and task D and between task C and task E. When focusing attention on tasks operating in each of states S5, S6 and S7, a state-evaluating-function value becomes "1", "1" and "0" for each of the states, and a consolidated evaluating-function value becomes: 1+1+0=2.

In contrast, in the allocation example of the method disclosed in PTL 1, a task allocation is divided at the division position 21 as a position between tasks which make a dependency number minimum, and thus, a consolidated evaluating-function value becomes: 1+1+1=3.

As described above, the task allocation optimizing system 1 according to this exemplary embodiment makes it possible to output an allocation having a more preferable evaluation value, that is, an optimization result in which task A, task B and task G are allocated to the core 0 and task C, task D, task E and task F are allocated to the core 1 (the core 0 and the core 1 may be reversed to each other).

In this way, the task allocation optimizing system 1 according to this exemplary embodiment makes it possible to, when state transitions are performed among operation states, select a task allocation which makes an inter-core dependency number minimum as a whole of the operation states. That is, a task allocation which makes a task dependency degree minimum can be selected. Accordingly, the task allocation optimizing system 1 according to this exemplary embodiment enables calculation of a task allocation which brings about higher performance.

In particular, in state S7, it becomes possible to output an allocation which makes an inter-core dependency number "0", so that it becomes possible to calculate a task allocation which brings about the highest performance.

In addition, in this exemplary embodiment, even when the number of cores constituting a target system increases, an inter-core dependency number can be similarly measured, and further, the inter-core dependency number can be also easily expanded in a target system including three or more cores.

Seventh Exemplary Embodiment

In this seventh exemplary embodiment, which is an application example of the task allocation optimizing system 1 according to the third exemplary embodiment, the number of cores, in a certain state, to each of which at least one task is allocated is made a state-evaluating-function value. That is, in the case where a system including n cores (n being an integer larger than or equal to "2") is made a target, when the number of cores, which operate in a certain state and to each of which at least one task is allocated, is m, this m is generated as a state-evaluating-function value in the state. In each of (n−m) cores, there exists no operating task in this state. A consolidated evaluating-function value generating unit 132 may generate, as a consolidated evaluating-function value, for example, the summation of state-evaluating-function values each associated with a corresponding one of operation states.

As described above, the task allocation optimizing method according to this exemplary embodiment is different from those of the third and fourth exemplary embodiments, and the like, and focuses attention on minimization of the number of cores operating in each state. Through this minimization of the number of operating cores, an application, such as a power consumption reduction realized by interrupting electric power supplied to the cores unnecessary for operation, becomes possible.

Next, a task allocation optimizing system 1 according to this seventh exemplary embodiment will be described in detail by using the same task set as that of the third exemplary embodiment. Description will be made by using an example in which there exists a restriction that, for each of cores, a total of execution times of tasks allocated to the core must not exceed "35". That is, a case where, for each of all states, since there exists, for each of cores, an upper limit in a total of execution times of tasks allocated to the core, it is difficult to employ such a simple task allocating method that minimizes the number of operating cores by allocating tasks to a specific core, is assumed. In the case where, in each of all states, a total of execution times of tasks is kept below an upper limit of execution times of a certain core, the number of operating cores constantly becomes one, so that it is easy to determine a task allocation.

FIG. 13 is a diagram illustrating a table containing state-evaluating-function values in this seventh exemplary embodiment in the case where the same allocation as that shown in FIG. 8 is made. That is, tasks (tasks A, C, E and G) enclosed by dashed lines are allocated to the core 0 and the other tasks are allocated to the core 1. In this allocation, the total of execution times of tasks allocated to each of the cores is smaller than or equal to "35", and satisfies the above upper limit.

Meanwhile, in this allocation, at least one task is executed in each of both the cores in any one of states, and thus, a state-evaluating-function value is "2" in each of all the states. For this reason, in the case where a consolidated evaluating-function value generating unit 132 makes the summation of state-evaluating-function values in their respective corresponding operation states a consolidated evaluating-function value, the consolidated evaluating-function value becomes "8". In this allocation, it is difficult to realize a power consumption reduction by interrupting electric power supplied to each of the cores. In order to realize a power consumption reduction, such a task allocation that allows interruption of electric power supplied to any of cores while satisfying an upper limit of a total value of execution times of each core is preferable.

FIG. 14 illustrates an example of a case where, in the task allocation optimizing system 1 according to this seventh exemplary embodiment, optimization of an allocation of tasks to cores is performed. In an allocation shown in FIG. 14, tasks A, B, C and D enclosed by dashed lines are allocated to the core 0 and tasks other than the tasks A, B, C and D are allocated to the core 1. In this allocation, in state S1, only the core 0 can operate, and in state 4, only the core 1 can operate, so that a state-evaluating-function value in each of these states becomes "1". A state-evaluating-function value in each of states S2 and S3 is "2". Thus, in the case where the consolidated evaluating-function value generating unit 132 makes the summation of state-evaluating-function values in their respective corresponding operation states a consolidated evaluating-function value, the consolidated evaluating-function value becomes "6", which is smaller than that in the case of FIG. 13.

In this allocation, since, in state S1, only the core 0 can operate, and in state 4, only the core 1 can operate, it is possible to realize a power consumption reduction by interrupting electric power supplied to the core 1 in state S1 and interrupting electric power supplied to the core 0 in state S4.

As described above, in this exemplary embodiment, a state-evaluating-function value is made the number of cores which operate in each operation state, and an allocation which minimizes a consolidated evaluating-function value resulting from consolidating the state-evaluating-function values is searched for. Further, in a specific state, the number of cores each of which does not execute any task is maximized. Accordingly, an application, such as a power consumption reduction realized by interrupting electric power supplied to cores which do not operate, can be realized.

In addition, in this exemplary embodiment, even when the number of cores constituting a target system increases, the number of operating cores can be similarly measured, and further, the number of operating cores can be also easily expanded in a target system including three or more cores. That is, the number of cores to each of which tasks are allocated should be minimized while keeping an upper limit of a total value of execution times when the each of cores executes the tasks allocated to itself. Accordingly, regardless of the number of cores, when an upper limit value for each of the cores is given, a task allocation can be easily determined.

Eighth Exemplary Embodiment

Figure 15:
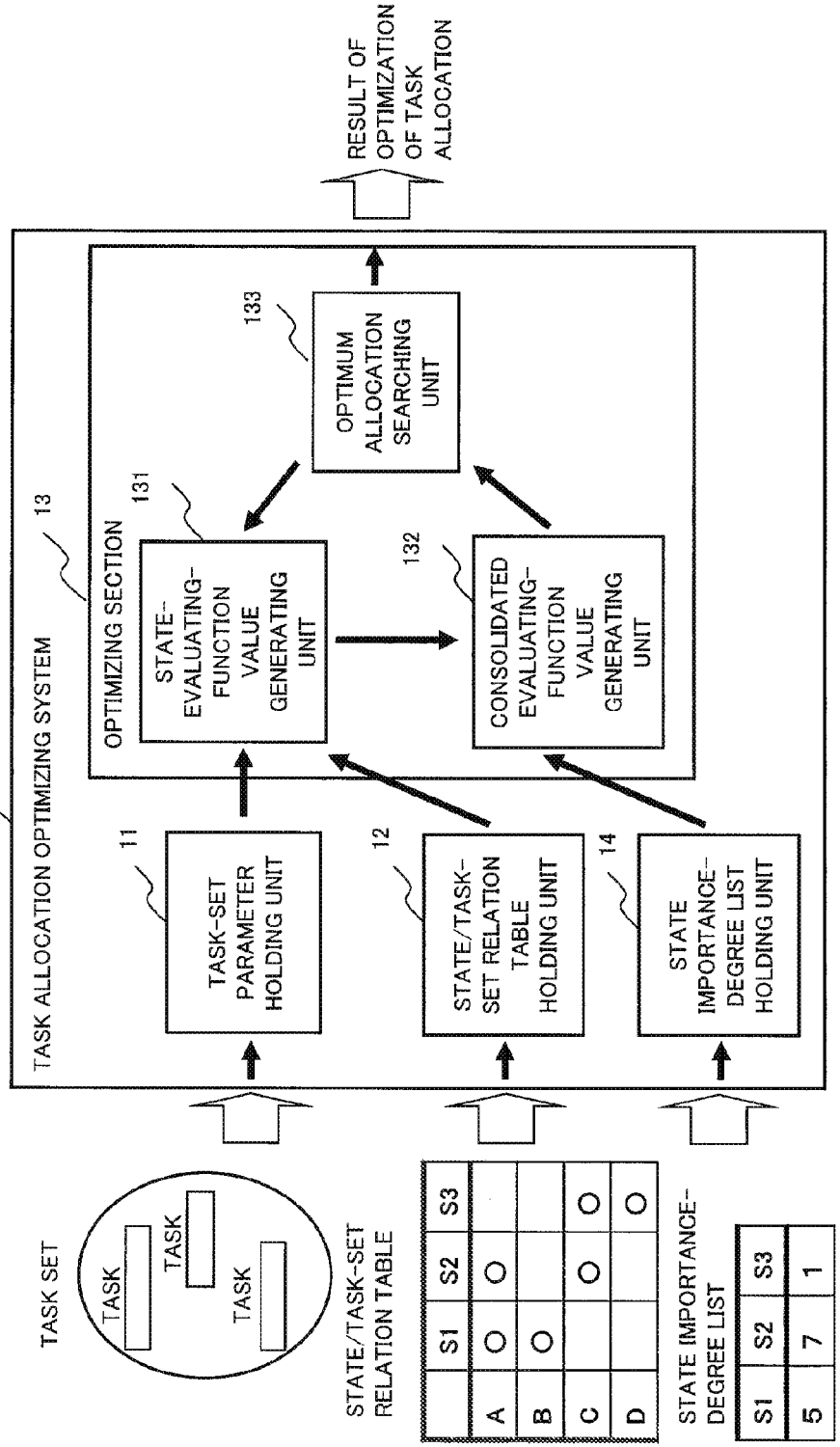

A configuration of a task allocation optimizing system 1 according to this eighth exemplary embodiment is illustrated in FIG. 15. In a configuration of this exemplary embodiment, there is further provided a state importance-degree list holding unit 14 in addition to the configuration of the task allocation optimizing system 1 according to each of exemplary embodiments 1 to 5.

The state importance-degree list holding unit 14 holds a state importance-degree list which specifies a state importance degree for each of states. This "state importance degree" is a coefficient which changes a degree of influence of a state-evaluating-function value in each state on a consolidated evaluating-function value when a consolidated evaluating-function value generation means 132 consolidates the state-evaluating-function values and generates the consolidated evaluating-function value.

The consolidated evaluating-function value generation means 132 generates an important-degree incorporated state-evaluating-function value resulting from changing a state-evaluating-function value in each state in accordance with a state importance degree specified by the state importance-degree list. Further, the consolidated evaluating-function value generation means 132 generates a consolidated evaluating-function value resulting from consolidating the generated important-degree incorporated state-evaluating-function values.

As an application example, there is a case where, when a task allocation is performed, it is desired to give greater importance to a task allocation in a specific state. This case corresponds to, for example, a case where a target system is significantly influenced by an inappropriate task allocation in a state in which there is no margin in an available memory capacity, or in a state in which there is no margin in execution times. In the case where such a system is made a target, a task allocation optimizing system 1 according to this eighth exemplary embodiment is intended to enable realization of a task allocation which places greater importance on a specific one of states than on each of the other ones of the states with respect to whether or not a task allocation in a relevant state is preferable.

Next, details of this exemplary embodiment will be described while comparing with the method according to the sixth exemplary embodiment by using a task set provided with the same task-set parameter as that of the sixth exemplary embodiment, shown in FIGS. 9 and 10.

FIG. 16 is a specific example of a state importance-degree list in a task set according to this eighth exemplary embodiment. In the example shown in FIG. 16, in which a larger numerical value means a higher importance degree, a state importance degree of each of states S5 and S6 is "1", and a state importance degree of state S6 is "2". Further, the consolidated evaluating-function value generation means 132 may be configured to, for example, calculate a value resulting from multiplying a state-evaluating-function value in each state with a state importance degree and calculate the summation thereof with respect to all the states of an evaluation target. The below is an example employing this method.

The state-evaluating-function value generation means 131 generates inter-core dependency numbers as state-evaluating-function values, just like the case of the sixth exemplary embodiment. FIG. 17 is a state/task-set relation table illustrating operation of optimization similar to that of the task allocation optimizing system according to the sixth exemplary embodiment and operation of optimization of a task allocation optimizing system according to this eighth exemplary embodiment.

With respect to division positions, as shown in FIG. 18, an example similar to that, shown in FIG. 12, according to the sixth exemplary embodiment is used, the division positions 21 and 22 shown in FIG. 12 correspond to division positions 23 and 24 shown in FIG. 18, respectively. In addition, as shown in FIGS. 17 and 18, in this eighth exemplary embodiment, operation tasks in state S5 will be described by using an example different from that of the sixth exemplary embodiment. The example of this eighth exemplary embodiment is an example in which, since a degree of influence of state 7 is large, it is preferable to obtain an allocation which makes the number of inter-core dependencies in state 7 as small as possible.

First, as shown in FIGS. 17 and 18, when the method according to the sixth exemplary embodiment is used, a resultant consolidated evaluating-function value is "3" in each of the cases of the division positions 23 and 24. Specifically, in the case of the division position 23, a state-evaluating-function value in each state is "1", and a consolidated evaluating-function value, which is the summation thereof, is "3". Further, in the case of the division position 24, a state-evaluating-function value in each state is "2" in state S5, "1" in state S6, and "0" in state S7, so that a consolidated evaluating-function value becomes: 2+1+0=3. That is, the consolidated evaluating-function values each associated with a corresponding one of the above two cases have the same value, and an allocation which makes the number of inter-core dependencies in state 7 as small as possible cannot be necessarily obtained.

Meanwhile, in the case where the method according to this eighth exemplary embodiment is used, a consolidated evaluating-function value in the case of the division position 23 is: 1×1+1×1+2×1=4. A consolidated evaluating-function value in the case of the division position 24 becomes: 1×2+1×1+2×0=3. Accordingly, a division position which makes a consolidated evaluating-function value smaller, that is, a division at the division position 24 is employed. In this way, it becomes possible to obtain an allocation which causes any inter-core dependency not to exist in state 7. As described above, in the case where the method according to this exemplary embodiment is used, optimization is performed such that a minimum one of consolidated evaluating-function values each having been subjected to weighting using the state importance degrees can be acquired. Accordingly, it becomes possible to obtain a task allocation which, in a state of a high importance degree, makes the number of divisions small, that is, a task allocation which makes the number of inter-core dependencies small.

As described above, in this exemplary embodiment, a state importance degree which is a coefficient which changes a degree of influence of a state-evaluating-function value in each state on a consolidated evaluating-function value is used. Further, a consolidated evaluating-function value is generated by using the state importance-degree list which specifies a state importance degree for each state. Accordingly, it becomes possible to obtain a task allocation which places greater importance on a specific one of states than on each of the other ones of the states with respect to whether a task allocation in a relevant state is preferable or unpreferable.

In addition, in the above-described exemplary embodiment, the state importance degree is incorporated by the consolidated evaluating-function value generating unit 132. The configuration may be made such that the state importance degree is incorporated in advance when a corresponding state-evaluating-function value is generated by the state-evaluating-function value generating unit 131, and the consolidated evaluating-function value generating unit 132 consolidates the state-evaluating-function values without referring to any state importance degree.

Besides, an application in which the state importance degree list and the state/task-set relation table are consolidated can be also considered. That is, the state/task-set relation table may indicate not only all operation states a target multi-core system can take and tasks executed in each of the operation states, but also an importance degree of each of the operation states.

Further, in this exemplary embodiment, a task allocation in view of state importance degrees is made, but the state importance degree has no relation with the number of cores. Accordingly, this exemplary embodiment can be also easily expanded in a target system including three or more cores.

Moreover, the state importance-degree list holding unit 14 may be omitted by directly supplying state importance degrees to the state-evaluating-function value generating unit 131 or the consolidated evaluating-function value generating unit 132.

Ninth Exemplary Embodiment

Figure 19:
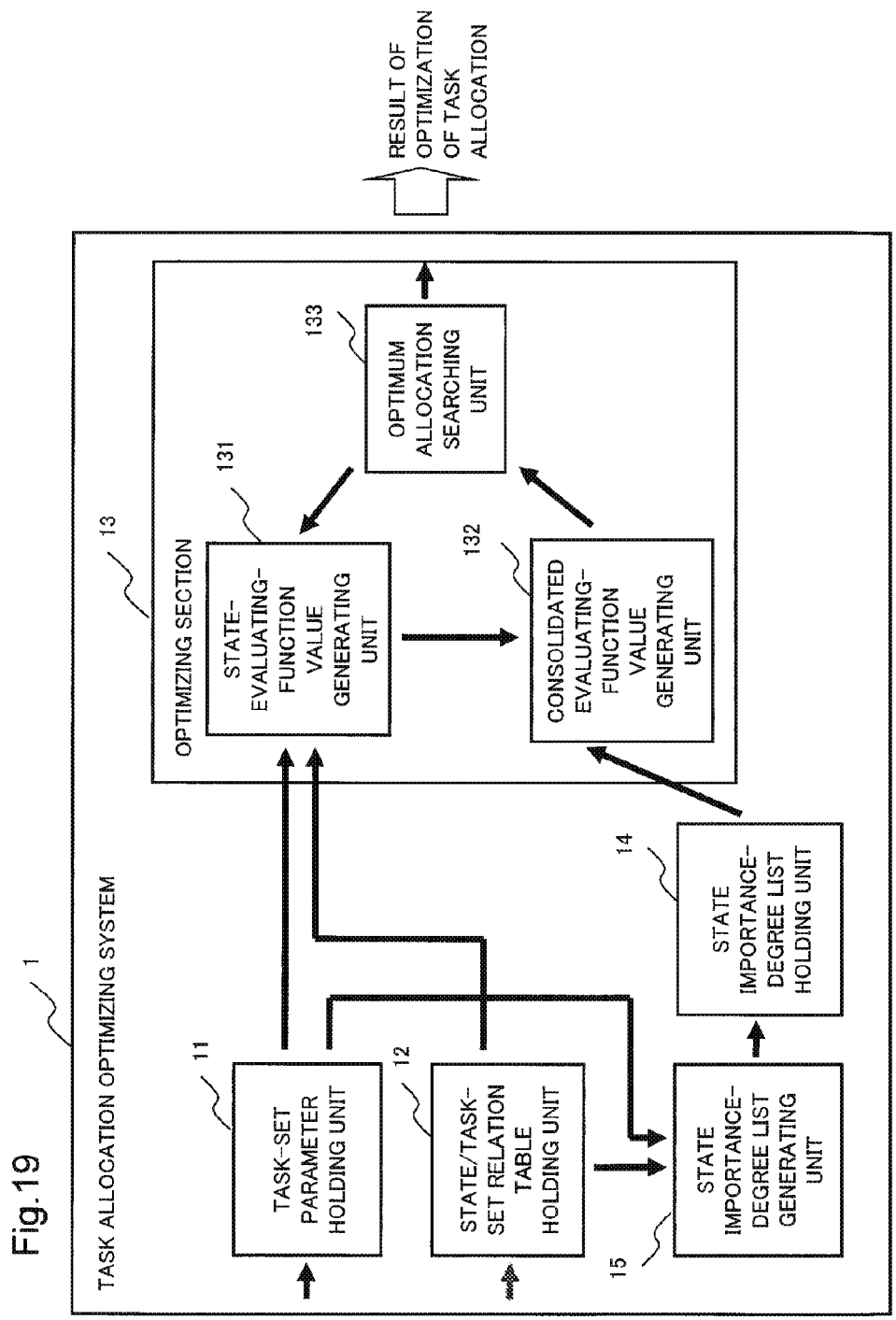

As shown in FIG. 19, a task allocation optimizing system 1 according to this ninth exemplary embodiment further includes a state importance degree generating unit 15 in addition to the constituents of the eighth exemplary embodiment.

The state importance degree generating unit 15 generates a state importance degree list. In this case, the state importance degree generating unit 15 gives a difference between an importance degree of a state subjected to a large influence of whether an allocation is preferable or unpreferable and an importance degree of a state subjected to a small influence thereof, and makes the importance degree of a state subjected to a large influence larger than that of a state subjected to a small influence.

As a specific example of a method for generating an important degree of each state, for example, there is a method in which the task-set parameter and the state/task-set relation table are referred to, and thereby an importance degree of a state in which there is no margin in execution time, a state in which there is no margin in an available memory capacity, and the like, are each made large. Alternatively, the important degree can be also made small with respect to each of states other than the above states. Through setting the important degrees in this way, it is possible to make a task allocation in view of a degree of influence of whether an allocation in each state is preferable or unpreferable.

In addition, in the operation of this ninth exemplary embodiment, the same methods as those of the eighth exemplary embodiment can be employed, except that the state importance degree list is generated by the state importance degree generating unit 15.

As described above, in this exemplary embodiment, the state importance degree list is automatically generated from the input of the task-set parameter and the state/task-set relation table, and a task allocation which places great importance on a state subjected to a large influence of whether a task allocation is preferable or unpreferable is made. Accordingly, it becomes possible to easily obtain a further effective allocation.

Further, in this exemplary embodiment, the number of cores does not influence the content of processing, and thus, this exemplary embodiment can be easily expanded in a target system including three or more cores.

Moreover, the state importance-degree list holding unit 14 may be omitted by directly supplying the state importance degrees to the state-evaluating-function value generating unit 131 or the consolidated evaluating-function value generating unit 132.

In addition, the present invention is not limited to the aforementioned first to ninth exemplary embodiments, and can be appropriately modified within a range not departing from the gist of the present invention. For example, the processes performed by each processing unit inside the aforementioned optimizing unit 13 may be carried out by mutually different hardware components in a distributed manner. Further, the aforementioned exemplary embodiment can be each combined with other exemplary embodiments.

Figure 20:
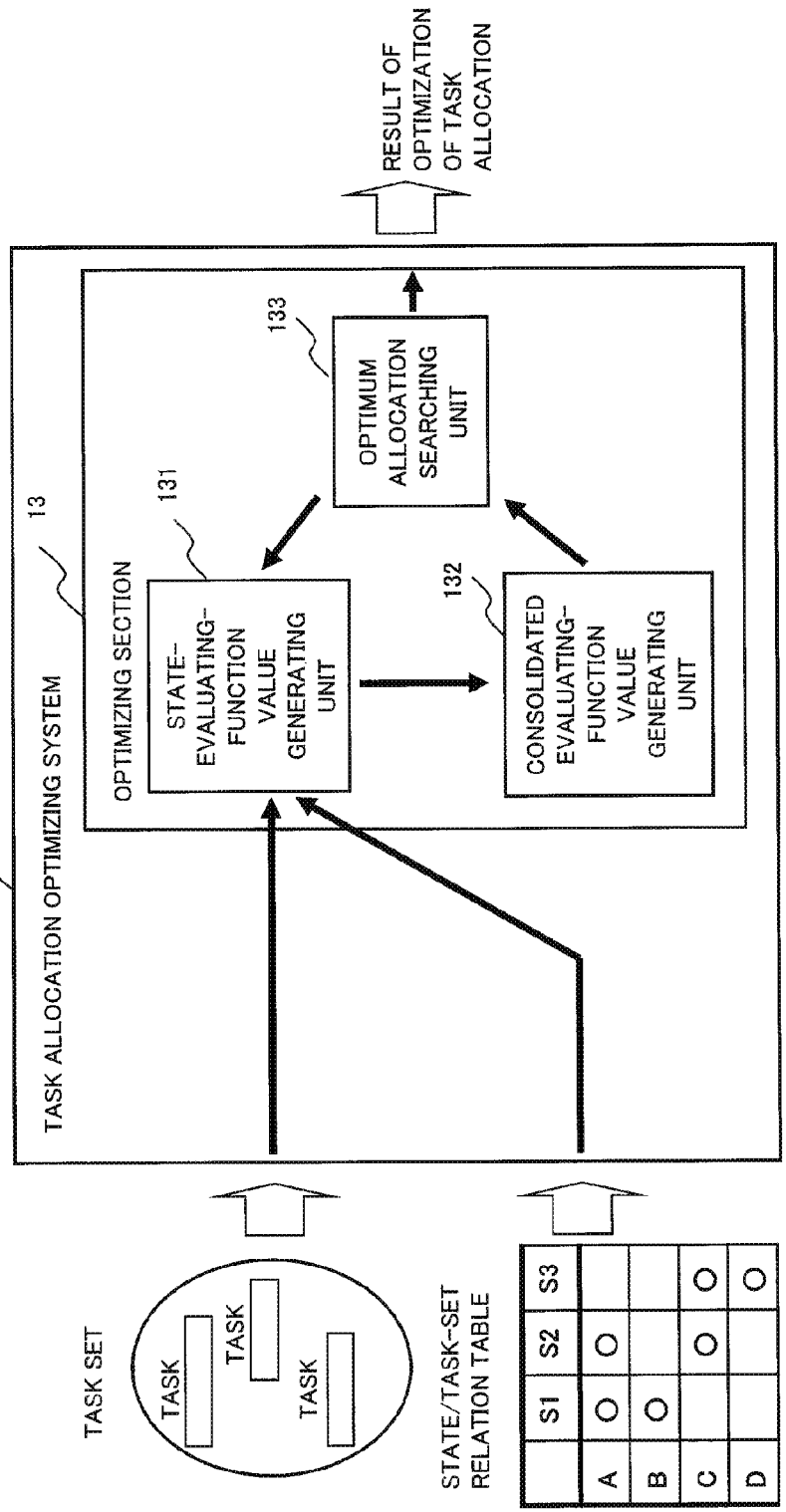
Figure 21:
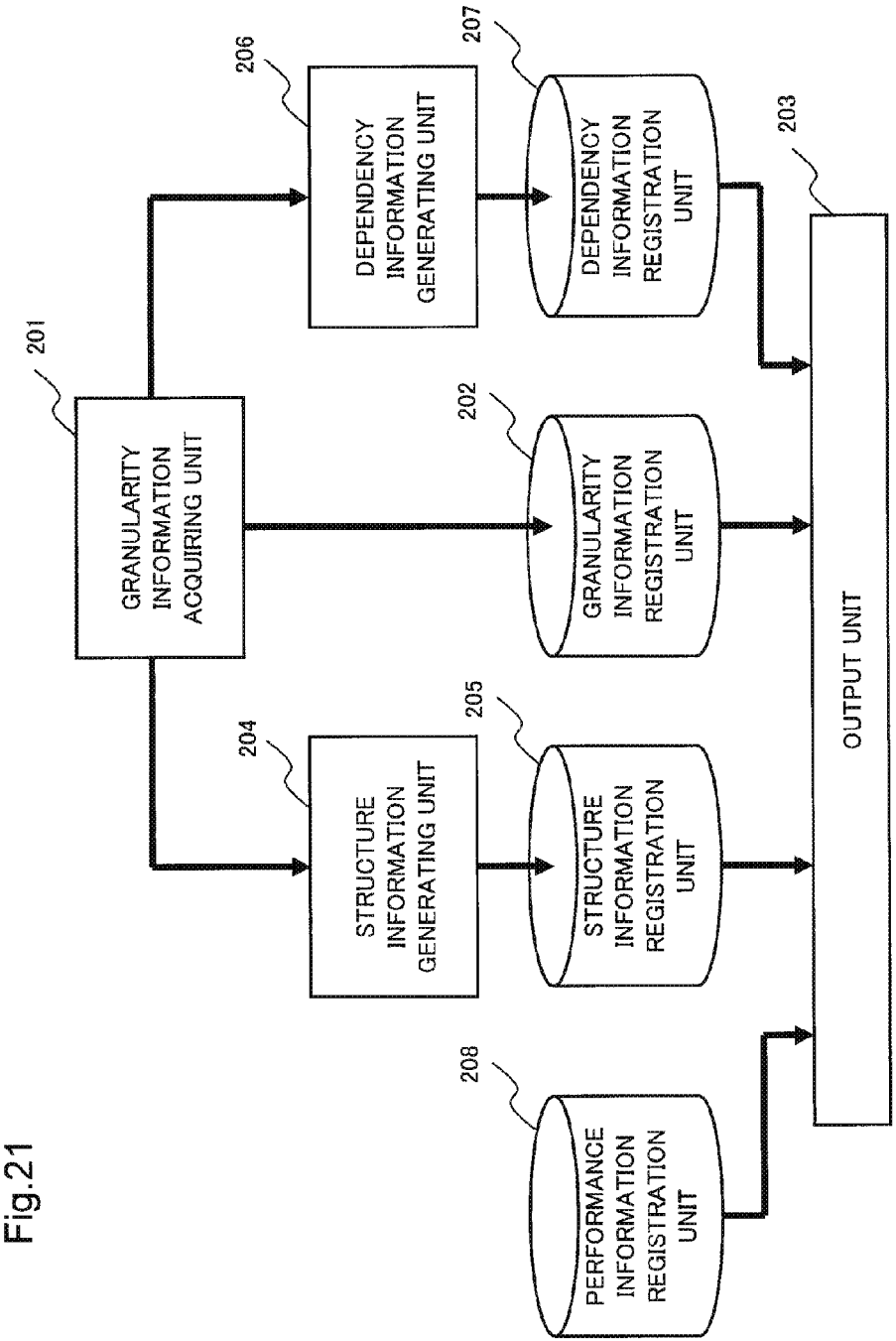

A minimum configuration of the task allocation optimizing system 1 according to the first exemplary embodiment is illustrated in FIG. 20. This configuration is the same as that shown in FIG. 1 except that the task-set parameter and the state/task-set relation table are directly supplied to the state-evaluating-function value generating unit 131.

Part of or the whole of the aforementioned exemplary embodiments can be also written as, but are not limited to, the following supplementary notes.

(Supplementary Note 1)

A task allocation optimizing system including:

state-evaluating-function value generating means that, on the basis of a state/task-set relation table indicating relations of a list of a plurality of operation states which are changed in accordance with an operation condition of a system including a plurality of processor cores with a task set which is a set of a plurality of tasks each operating in at least one of the operation states, as well as a task-set parameter indicating a property of each of the tasks constituting the task set, and being reference information for use in making a task allocation which is an allocation of the tasks to the plurality of processor cores, generates, for each of the operation states, a state-evaluating-function value which is an evaluation value indicating a degree of preferability of a task allocation for the each operation state;

consolidated evaluating-function value generation means that generate a consolidated evaluating-function value which is an evaluation value indicating a degree of preferability of a whole of the task set targeted for an evaluation, and which results from consolidating the state-evaluating-function value for each of the operation states; and optimum allocation searching means that searches for and makes a task allocation being based on the task allocation to the plurality of processor cores and maximizing the degree of preferability indicated by the consolidated evaluating-function value.

(Supplementary Note 2)

The task allocation optimizing system according to supplementary note 1, wherein the state-evaluating-function value generating means calculates, for each of the plurality of processor cores, a total value of execution times when the each processor core executes tasks allocated to itself by the optimum allocation searching means, and generates, as the state-evaluating-function value, an absolute value or a square of a difference between a plurality of the total values each associated with a corresponding one of the processor cores.

(Supplementary Note 3)

The task allocation optimizing system according to supplementary note 1, wherein the system includes the processor cores whose total number is N (N being an integer larger than or equal to 3), and wherein the state-evaluating-function value generating means calculates, for each of the N processor cores, a total value of execution times when the each processor core executes the tasks allocated by the optimum allocation searching means, generates, for each of a whole or part of all combinations of every two of the N processor cores, an absolute value or a square of a difference between any two of the total values of execution times, each of the total values being associated with a corresponding one of the processor cores, as a temporary state-evaluating-function value associated with a corresponding one of the whole or the part of combinations, and generates the state-evaluating-function value by consolidating the temporary state-evaluating-function values.

(Supplementary Note 4)

The task allocation optimizing system according to supplementary note 3, wherein the state-evaluating-function value generating means generates a summation or a multiplication of the temporary state-evaluating-function values as the state-evaluating-function value.

(Supplementary Note 5)

The task allocation optimizing system according to any one of supplementary notes 1 to 4, wherein the consolidated evaluating-function value generating means generates a summation or a multiplication of the state-evaluating-function values as the consolidated evaluating-function value.

(Supplementary Note 6)

The task allocation optimizing system according to supplementary note 1, wherein the state-evaluating-function value generating means generates, for each of the operation states, a total number of a dependency between a plurality of processor cores as the state-evaluating-function value.

(Supplementary Note 7)

The task allocation optimizing system according to supplementary note 1, wherein the state-evaluating-function value generating means generates, for each of the operation states, a total number of a processor core of the plurality of processor cores which is needed to execute tasks allocated to the processor core, as the state-evaluating-function value.

(Supplementary Note 8)

The task allocation optimizing system according to any one of supplementary notes 1 to 7, wherein the consolidated evaluating-function value generating means is configured to, when generating the consolidated evaluating-function value by consolidating the state-evaluating-function values, refers to a state importance-degree list which specifies, for each of the operation states, a state importance degree which is a coefficient for changing a degree of influence of the state-evaluating-function value on the consolidated evaluating-function value, generates, for each of the operation states, an important-degree incorporated state-evaluating-function value resulting from changing the state-evaluating-function value of the each operation state in accordance with the state importance degree, and generates the consolidated evaluating-function value by consolidating the important-degree incorporated state-evaluating-function values.

(Supplementary Note 9)

The task allocation optimizing system according to supplementary note 7, further including a state importance-degree list generating means that generates the state importance-degree list by setting, for each of the operation states, a state importance degree in accordance with a degree of influence on the degree of preferability.

(Supplementary Note 10)

The task allocation optimizing system according to any one of supplementary notes 1 to 9, further including:

state/task-set relation table holding means that holds the state/task-set relation table inputted from an outside; and task-set parameter holding means that holds the task-set parameter inputted from an outside.

(Supplementary Note 11)

The task allocation optimizing system according to any one of supplementary notes 1 to 10, wherein the optimum allocation searching means preferentially selects, as an optimum allocation, a task allocation candidate for which the consolidated evaluating-function value is small.

(Supplementary Note 12)

A task allocation optimizing method including:

on the basis of a state/task-set relation table indicating relations of a list of a plurality of operation states which are changed in accordance with an operation condition of a system including a plurality of processor cores with a task set which is a set of a plurality of tasks each operating in at least one of the operation states, as well as a task-set parameter indicating a property of each of the tasks constituting the task set, and being reference information for use in making a task allocation which is an allocation of the tasks to the plurality of processor cores, generating, for each of the operation states, a state-evaluating-function value which is an evaluation value indicating a degree of preferability of a task allocation for the each operation state;

generating a consolidated evaluating-function value which is an evaluation value indicating a degree of preferability of a whole of the task set targeted for an evaluation, and which results from consolidating the state-evaluating-function value for each of the operation states; and searching for and making a task allocation which maximizes the degree of preferability indicated by the consolidated evaluating-function value.

(Supplementary Note 13)

A task allocation optimizing program that causes a computer to function as:

state-evaluating-function value generating means that, on the basis of a state/task-set relation table indicating relations of a list of a plurality of operation states which are changed in accordance with an operation condition of a system including a plurality of processor cores with a task set which is a set of a plurality of tasks each operating in at least one of the operation states, as well as a task-set parameter indicating a property of each of the tasks constituting the task set, and being reference information for use in making a task allocation which is an allocation of the tasks to the plurality of processor cores, generates, for each of the operation states, a state-evaluating-function value which is an evaluation value indicating a degree of preferability of a task allocation for the each operation state;

consolidated evaluating-function value generation means that generate a consolidated evaluating-function value which is an evaluation value indicating a degree of preferability of a whole of the task set targeted for an evaluation, and which results from consolidating the state-evaluating-function value for each of the operation states; and optimum allocation searching means that searches for and makes a task allocation being based on the task allocation to the plurality of processor cores and maximizing the degree of preferability indicated by the consolidated evaluating-function value.

(Supplementary Note 14)

A non-temporary computer-readable storage medium storing the task allocation optimizing program according to supplementary note 13.

Hereinbefore, the present invention has been described with reference to exemplary embodiments, but the present invention is not limited to the above-described exemplary embodiments. Various changes understandable by those skilled in the art can be made on the configuration and details of the present invention within the scope of the present invention.

This application is based upon and claims the benefit of priority from Japanese patent application No. 2011-277267, filed on Nov. 17, 2011, the disclosure of which is incorporated herein in its entirety by reference.

INDUSTRIAL APPLICABILITY

The task allocation optimizing system according to the present invention can be applied to, for example, various systems for supporting a task allocation of a multi-processor system. As a specific realization means for the task allocation optimizing system according to the present invention, any special hardware is not required. Accordingly, the task allocation optimizing system according to the present invention can be realized by being incorporated into a general computer.

REFERENCE SIGNS LIST

1: Task allocation optimizing system
11: Task-set parameter holding unit
12: State/task-set relation table holding unit
13: Optimizing unit
131: State-evaluating-function value generating unit
132: Consolidated evaluating-function value generating unit
133: Optimum allocation searching unit
14: State importance-degree list holding unit
15: State importance degree list generating unit
21, 22, 23 and 24: Division position
5: Computer
51: Processor
52: Storage device
61: Task allocation optimizing program.
62: Task-set definition file
63: State/task-set relation table definition file
64: Task optimum allocation definition file
201: Granularity information acquiring unit
202: Granularity information registration unit
203: Output unit
204: Structure information generating unit
205: Structure information registration unit
206: Dependency information generating unit
207: Dependency information registration unit
208: Performance information registration unit

What is claimed is:

1. A task allocation optimizing system comprising:
a memory storing therein:
   a program, and
   a state/task-set relation table comprising a list of a plurality of operating states and at least one task, wherein the at least one task is mapped to at least one of the plurality of operating states; and
a processor comprising at least one core, each of the at least one core configured to operate in at least one of the plurality of operating states, the processor configured to execute the program stored in the memory and thereby:
   generate, for each one operating state of the plurality of operating states, a state evaluating-function value which indicates a first degree of preferability, wherein the first degree of preferability indicates a preference of at least one task, of a plurality of tasks of a task set, being allocated to the one operating state;
   generate, a consolidated evaluating-function value which indicates a second degree of preferability calculated by consolidating the state evaluating-function value of each of the plurality of operating states; and
   allocate each of the plurality of tasks of the task set to one of the at least one core based on the consolidated evaluating-function value;
   wherein the processor comprises a first core and a second core, and the processor is further configured to:
      calculate for the first core, an execution value based on a number of occurrences in which the at least one task is allocated to a plurality of operating states belonging to the first core;
      calculate for the second core, an execution value based on a number of occurrences in which the at least one task is allocated to a plurality of operating states belonging to the second core; and
      generate the state evaluating-function value as an absolute value of a difference between the execution value of the first core and the execution value of the second core.

2. The task allocation optimizing system of claim 1 wherein the processor is further configured to:
   generate the consolidated evaluating-function value as a summation or multiplication of the state evaluating function value for each of the plurality of operating states.

3. The task allocation optimizing system of claim 1 wherein the processor is further configured to:
   generate the state evaluating-function value for each of the plurality of operating states, as a magnitude of a dependency relation among the plurality of tasks of a task set.

4. The task allocation optimizing system of claim 1 wherein the processor is further configured to:
   generate the state evaluating-function value for each one operating state of the plurality of operating states as a total number of cores, of at least one core required to execute the plurality of tasks of the task set being allocated to the one operating state.

5. The task allocation optimizing system of claim 1, wherein the memory further stores a state importance degree list specifying, for each one operating state of the plurality of operating states, a state importance degree, wherein the state importance degree comprises a coefficient of a changing degree of influence of the state evaluating-function value generated for the one operating state on the consolidated evaluating-function value; and
   wherein the processor is further configured to:
      generate an important degree incorporated state evaluating-function value for each of the plurality of operating states, by changing the state evaluating-function value generated for each of the plurality of operating states based on the state importance degree of each of the plurality of operating states, respectively; and
      generate the consolidated evaluating-function value by consolidating the importance degree incorporated state evaluating-function value for each of the plurality of operating states.

6. A task allocation optimizing system comprising:
a memory storing therein:
   a program, and
   a state/task-set relation table comprising a list of a plurality of operating states and at least one task, wherein the at least one task is mapped to at least one of the plurality of operating states; and
a processor comprising at least one core, each of the at least one core configured to operate in at least one of the plurality of operating states, the processor configured to execute the program stored in the memory and thereby:
   generate, for each one operating state of the plurality of operating states, a state evaluating-function value which indicates a first degree of preferability, wherein the first degree of preferability indicates a preference of at least one task, of a plurality of tasks of a task set, being allocated to the one operating state;
   generate, a consolidated evaluating-function value which indicates a second degree of preferability calculated by consolidating the state evaluating-function value of each of the plurality of operating states; and
allocate each of the plurality of tasks of the task set to one of the at least one core based on the consolidated evaluating-function value;
wherein the processor comprises a first core, a second core, and a third core, and the processor is further configured to:
   calculate for the first core, an execution value based on a number of occurrences in which the at least one task is allocated to a plurality of operating states belonging to the first core;
   calculate for the second core, an execution value based on a number of occurrences in which the at least one task is allocated to a plurality of operating states belonging to the second core;
   calculate for the third core, an execution value based on a number of occurrences in which the at least one task is allocated to a plurality of operating states belonging to the third core;
   generate, for each combination of two cores of the first core, the second core, and the third core, a temporary state evaluating function value based on an absolute value of a difference between the execution value of a first one of the two cores and the execution value of a second one of the two cores; and
   generate the state evaluating-function value by consolidating the temporary state evaluation function value for all combinations of two cores of the first core, the second core, and the third core.

7. The task allocation optimizing system of claim 6 wherein the processor is further configured to:
generate the state evaluating-function value based on a summation or a multiplication of the temporary state evaluation function value for all combinations of two cores of the first core, the second core, and the third core.

8. The task allocation optimizing system of claim 6 wherein the processor is further configured to:
generate the consolidated evaluating-function value as a summation or multiplication of the state evaluating function value for each of the plurality of operating states.

9. The task allocation optimizing system of claim 6 wherein the processor is further configured to:
generate the state evaluating-function value for each of the plurality of operating states, as a magnitude of a dependency relation among the plurality of tasks of a task set.

10. The task allocation optimizing system of claim 6 wherein the processor is further configured to:
generate the state evaluating-function value for each one operating state of the plurality of operating states as a total number of cores, of at least one core required to execute the plurality of tasks of the task set being allocated to the one operating state.

11. The task allocation optimizing system of claim 6, wherein the memory further stores a state importance degree list specifying, for each one operating state of the plurality of operating states, a state importance degree, wherein the state importance degree comprises a coefficient of a changing degree of influence of the state evaluating-function value generated for the one operating state on the consolidated evaluating-function value; and
wherein the processor is further configured to:
generate an important degree incorporated state evaluating-function value for each of the plurality of operating states, by changing the state evaluating-function value generated for each of the plurality of operating states based on the state importance degree of each of the plurality of operating states, respectively; and
generate the consolidated evaluating-function value by consolidating the importance degree incorporated state evaluating-function value for each of the plurality of operating states.

12. A task allocation optimizing method comprising:
a processor, comprising a first core and a second core, each of the first core and the second core configured to operate in at least one of a plurality of operating states, the processor executing a program stored in a memory and thereby:
generating, for each one operating state of the plurality of operating states, a state evaluating-function value which indicates a first degree of preferability, wherein the first degree of preferability indicates a preference of at least one task, of a plurality of tasks of a task set, being allocated to the one operating state;
generating, a consolidated evaluating-function value which indicates a second degree of preferability calculated by consolidating the state evaluating-function value of each of the plurality of operating states;
allocating each of the plurality of tasks of the task set to one of the first core and the second core based on the consolidated evaluating-function value;
calculating for the first core, an execution value based on a number of occurrences in which the at least one task is allocated to a plurality of operating states belonging to the first core;
calculating for the second core, an execution value based on a number of occurrences in which the at least one task is allocated to a plurality of operating states belonging to the second core; and
generating the state evaluating-function value as an absolute value of a difference between the execution value of the first core and the execution value of the second core.

13. A non-transitory computer-readable storage medium storing a task allocation optimizing program that causes a computer to function as:
a state evaluating-function value generating unit which generates a state evaluating-function value, for each one operating state of a plurality of operating states of a plurality of cores of a processor, which indicates a first degree of preferability, wherein the first degree of preferability indicates a preference of at least one task, of a plurality of tasks of a task set, being allocated to the one operating state;
a consolidated evaluating-function value generation unit that generates a consolidated evaluating-function value which indicates a second degree of preferability calculated by consolidating the state evaluating-function value of each of the plurality of operating states; and
an optimum allocation searching unit that allocates each of the plurality of tasks of the task set to one of the plurality of cores based on the consolidated evaluating-function value;
wherein the plurality of cores comprises a first core and a second core, and wherein the task allocation optimizing program further causes the computer to:
calculate for the first core, an execution value based on a number of occurrences in which the at least one task is allocated to a plurality of operating states belonging to the first core;
calculate for the second core, an execution value based on a number of occurrences in which the at least one task is allocated to a plurality of operating states belonging to the second core; and
generate the state evaluating-function value as an absolute value of a difference between the execution value of the first core and the execution value of the second core.

14. A task allocation optimizing method comprising:
a processor, comprising a first core, a second core, and a third core, each of the first core, the second core, and the third core configured to operate in at least one of a plurality of operating states, the processor executing a program stored in a memory and thereby:
generating, for each one operating state of the plurality of operating states, a state evaluating-function value which indicates a first degree of preferability, wherein the first degree of preferability indicates a preference of at least one task, of a plurality of tasks of a task set, being allocated to the one operating state;
generating, a consolidated evaluating-function value which indicates a second degree of preferability calculated by consolidating the state evaluating-function value of each of the plurality of operating states;
allocating each of the plurality of tasks of the task set to one of the first core, the second core, and the third core based on the consolidated evaluating-function value;

calculating for the first core, an execution value based on a number of occurrences in which the at least one task is allocated to a plurality of operating states belonging to the first core;

calculating for the second core, an execution value based on a number of occurrences in which the at least one task is allocated to a plurality of operating states belonging to the second core;

calculating for the third core, an execution value based on a number of occurrences in which the at least one task is allocated to a plurality of operating states belonging to the third core;

generating, for each combination of two cores of the first core, the second core, and the third core, a temporary state evaluating function value based on an absolute value of a difference between the execution value of a first one of the two cores and the execution value of a second one of the two cores; and generating the state evaluating-function value by consolidating the temporary state evaluation function value for all combinations of two cores of the first core, the second core, and the third core.

15. A non-transitory computer-readable storage medium storing a task allocation optimizing program that causes a computer to function as:

a state evaluating-function value generating unit which generates a state evaluating-function value, for each one operating state of a plurality of operating states of a plurality of cores of a processor, which indicates a first degree of preferability, wherein the first degree of preferability indicates a preference of at least one task, of a plurality of tasks of a task set, being allocated to the one operating state;

a consolidated evaluating-function value generation unit that generates a consolidated evaluating-function value which indicates a second degree of preferability calculated by consolidating the state evaluating-function value of each of the plurality of operating states; and an optimum allocation searching unit that allocates each of the plurality of tasks of the task set to one of the plurality of cores based on the consolidated evaluating-function value;

wherein the plurality of cores comprises a first core, a second core, and a third core, and the task allocation optimizing program further causes the computer to:

calculate for the first core, an execution value based on a number of occurrences in which the at least one task is allocated to a plurality of operating states belonging to the first core;

calculate for the second core, an execution value based on a number of occurrences in which the at least one task is allocated to a plurality of operating states belonging to the second core;

calculate for the third core, an execution value based on a number of occurrences in which the at least one task is allocated to a plurality of operating states belonging to the third core;

generate, for each combination of two cores of the first core, the second core, and the third core, a temporary state evaluating function value based on an absolute value of a difference between the execution value of a first one of the two cores and the execution value of a second one of the two cores; and generate the state evaluating-function value by consolidating the temporary state evaluation function value for all combinations of two cores of the first core, the second core, and the third core.

* * * * *